(12) United States Patent
'T Hooft et al.

(10) Patent No.: US 9,417,057 B2
(45) Date of Patent: Aug. 16, 2016

(54) OPTICAL SENSING SYSTEM FOR DETERMINING THE POSITION AND/OR SHAPE OF AN ASSOCIATED OBJECT

(71) Applicant: KONINKLIJKE PHILIPS N.V., Eindhoven (NL)

(72) Inventors: Gert Wim 'T Hooft, Eindhoven (NL); Merel Danielle Leistikow, Vleuten (NL); Jeroen Jan Lambertus Horikx, Weert (NL); Milan Jan Henri Marell, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/384,167

(22) PCT Filed: Mar. 11, 2013

(86) PCT No.: PCT/IB2013/051905
§ 371 (c)(1),
(2) Date: Sep. 10, 2014

(87) PCT Pub. No.: WO2013/136247
PCT Pub. Date: Sep. 19, 2013

(65) Prior Publication Data
US 2015/0029511 A1   Jan. 29, 2015

Related U.S. Application Data

(60) Provisional application No. 61/611,646, filed on Mar. 16, 2012, provisional application No. 61/657,176, filed on Jun. 8, 2012.

(51) Int. Cl.
*G01B 11/14* (2006.01)
*G01L 1/24* (2006.01)
(Continued)

(52) U.S. Cl.
CPC .......... *G01B 11/14* (2013.01); *G01B 9/02049* (2013.01); *G01B 11/16* (2013.01); *G01B 11/24* (2013.01); *G01L 1/246* (2013.01)

(58) Field of Classification Search
CPC ........ G01L 1/246; G01B 11/14; G01B 11/24; G01B 11/16; G01B 9/02049
USPC ...................................................... 385/12–13
See application file for complete search history.

(56) References Cited

U.S. PATENT DOCUMENTS 6,337,737 B1 * 1/2002 Chang ................ G01D 5/35316
250/227.18
7,781,724 B2   8/2010 Childers
(Continued)

FOREIGN PATENT DOCUMENTS

WO   WO2011098926 A1   8/2011

OTHER PUBLICATIONS

Kogelnik H. et al., "Filter Response of Nonuniform Almost-Periodic Structures", 1976 American Telephone and Telegraph Company, The Bell System Technical Journal., vol. 55, No. 1, Jan. 1976, pp. 109-127.
(Continued)

Primary Examiner — Michael A Lyons
Assistant Examiner — Dominic J Bologna

(57) ABSTRACT

The present invention relates to an optical sensing system (1) for determining the position and/or shape of an associated object (O), the system comprises an optical fibers (10) having one or more optical fiber cores (9) with one or more fiber Bragg gratings (FBG, 8) extending along the full length where the position and/or shape is be to determined of said object (O). A reflectometer (REFL, 12) measures strain at a number of sampling points along the optical fiber cores, and a processor (PROC, 14) determines the position and/or shape based on said measured strains from the plurality of optical fiber cores. The fiber Bragg grating(s) (FBG, 8) extends along the full length of said optical fiber cores (9), the fiber core having a spatially modulated reflection (r) along the said full length of the optical fiber core so that the corresponding reflection spectrum is detectable in said wavelength scan. Thus, the fiber Bragg grating(s) may be effectively continuous along the optical fiber leaving no gaps so that every position gives rise to a detectable reflection, and achieving that the reflection spectrum may encompass a wavelength span equaling the wavelength scan, or 'sweep', of an optical source in the reflectometer.

10 Claims, 18 Drawing Sheets

(51) Int. Cl.
*G01B 11/16* (2006.01)
*G01B 9/02* (2006.01)
*G01B 11/24* (2006.01)

(56) References Cited

U.S. PATENT DOCUMENTS

2004/0197050 A1* 10/2004 Lovseth ................ G01B 11/16
  385/37
2007/0065077 A1  3/2007 Childers
2009/0123111 A1* 5/2009 Udd ........................ A61B 5/06
  385/13
2009/0324161 A1* 12/2009 Prisco ................ A61B 19/2203
  385/13
2011/0109898 A1  5/2011 Froggatt
2011/0310378 A1  12/2011 Froggatt

OTHER PUBLICATIONS

Sumetsky M. et al., "Holographic Methods for Phase Mask and Fiber Grating Fabrication and Characterization", Laser Micromachining for Optoelectronic Device Fabrication, Andreas Ostendorf, Editor, Proceedings of SPIE, vol. 4941, 2003.

* cited by examiner

FIG. 16 (INHOMOG.)

FIG. 17 (INHOMOG. & PARTIAL OVERLAP.)

OPTICAL SENSING SYSTEM FOR DETERMINING THE POSITION AND/OR SHAPE OF AN ASSOCIATED OBJECT

CROSS-REFERENCE TO PRIOR APPLICATIONS

This application is the U.S. National Phase application under 35 U.S.C. §371 of International Application Serial No. PCT/IB2013/051905, filed on Mar. 11, 2013, which claims the benefit of U.S. Application Ser. No. 61/611,646, filed on Mar. 16, 2012, and U.S. Application Ser. No. 61/657,176, filed on Jun. 8, 2012. These applications are hereby incorporated by reference herein.

BACKGROUND OF THE INVENTION

In many minimally invasive healthcare procedures, it is advantageous to track the medical devices such as guide wires and catheters. Optical shape sensing enables this by measuring and analyzing the light reflected from all positions of a multi core optical fiber built into the elongated medical device. When interferometer is used a full distribution of strain along the fiber is obtained, which can be converted into shape. A description of the method can be found in patent application US 2011/0109898 entitled "Optical position and/or shape sensing". The backscattering of light in an optical fiber can be classified in two different classes: 1) an intrinsic phenomenon, viz. Rayleigh scattering, and 2) an extrinsic phenomenon, viz. Bragg gratings. Note that one then disregards a third scattering mechanism, viz. Brillouin scattering. Brillouin scattering cannot be employed in an interferometric measurement technique and leads to a poor spatial resolution. One implementation of optical shape sensing employs Rayleigh scattering. This has the advantage of using the optical fiber without additional steps in manufacturing after fiber draw.

Signal Strength of Rayleigh Scattering

The manufacturers of telecommunication fibers have increased the quality of their products over the years to such an extent that the transmission losses are small and mainly due to Rayleigh scattering. For shape sensing this has the disadvantage that the signal strength is rather low. In Annex I, its magnitude is calculated together with the ensuing signal to noise ratio. The small signal to noise ratio urges one to take additional precautions in the interferometric measurement system:

The reflection of the distal end of the fiber overwhelms all other signals, is too large and has to be reduced by at least 80 dB. In order to do so absorbing glass is fusion spliced to the distal end. This termination, however, is fragile and breaks of easily, so that integration of the fiber in medical devices has a low yield. Moreover, this kind of termination has the side effect that the last 5-10 mm of the fiber cannot be shape tracked.

A shape sensing fiber contains at least 4 cores. Each of the cores is connected to a separate interferometer. Therefore, the system contains an element where individual single core fibers are attached to one multi-core fiber: the fan out. At the fan out and at the termination of the sensing fiber cross talk arises: light that propagates down the fiber in a particular core is scattered at these points back into one of the other cores towards the detectors. This cross talk can be mitigated by configuring the four interferometers in a staggered alignment. See patent application US 2011/0310378 entitled "Interferometric measurement with crosstalk suppression". The staggering of the interferometers entails the incorporation of substantial amounts of fiber in each of the interferometer arms. In total, the system will contain 500-600 m of additional fiber, making it more sensitive to temperature variations and mechanical vibrations.

Each of the interferometers has a built in optical circulator unit. With this S-port device the light from the source (port 1) is directed towards the sensing fiber (port 2), and the back scattered signal from the sensing fiber is directed towards the detectors (port 3). The light entering port 1 should not leak into port 3, otherwise is would overwhelm the true Rayleigh signal and saturate the detectors. The rejection ratio of most circulators is too low for sensing using Rayleigh scattering. Each circulator is tested and about 10% meets the proper specifications.

In minimal invasive healthcare applications, the interferometers will be built into a special vibration and temperature stabilized box. The medical device (catheter, guidewire) with its built-in shape-sensing fiber will be used in the sterile part of the Cath Lab. In between the two will be at least one optical patch cord. This means that there will be at least two optical multi-core connectors. Reflections at these connectors deteriorate the Rayleigh signals and are prone to give rise to cross talk effects. Current systems (e.g. Luna 3-rd generation) will not be able to function properly with more than one multi-core connector.

In between the interferometer box and the shape sensing fiber there will be additional lead wires. Those lead wires will also give rise to Rayleigh scattering, which will be of the same order of magnitude as the Rayleigh signal from the sensing fiber. The consequence is that those lead wires have to be interrogated as well and only after converting from spectrum as a function of optical frequency to signal as a function of delay, i.e. fiber position, the information from the lead wires can be discarded. Giving the finite sampling frequency and frequency sweep rate of the optical source, this gives an upper limit to the length of the lead wires.

Phase Retrieval of Rayleigh Scattering

Apart from the effects due to small signal strength, Rayleigh scattering has an enhanced sensitivity to mechanical vibrations as will be explained below.

A shape measurement comprises a scan over a wavelength range $\Delta\lambda$ (e.g. 20 nm) around a central wavelength $\lambda_b$ (e.g. 1540 nm). The spectrum is Fourier transformed resulting in a complex signal as a function of delay time, which is calibrated into position along the length of the fiber. The Fourier transformed signal is compared to a similar signal measured when the fiber was in a reference position, e.g. a straight line. In the comparison, the difference in phase (angle in the complex plane) of the two signals is taken at the corresponding position on the fiber. The slope of this phase difference as a function of position corresponds to the various strain components and can be translated into shape of the fiber. The integral of the strain at a given position is a measure of the total integrated length change of the fiber core. This length change means that the corresponding point of the reference measurement has shifted with respect to the shape measurement. Consequently, a shape tracking algorithm has to be employed that ensures the coherence between shape measurement and reference. Moreover, from measurement to measurement the starting point of reference measurement will be shifted with respect to the starting point of the current shape measurement owing to length changes in the patch cord. Length changes in the patch cord are caused by vibrations and temperature fluctuations. At the start of the phase tracking algorithm a cross correlation has to be performed in order to find the corresponding starting positions. There will be an upper limit in the allowed difference of the two corresponding positions on the fiber while still maintaining coherence of the phase signals.

This upper limit will now be estimated and is a measure for the sensitivity of the system to mechanical vibrations and temperature fluctuations.

Rayleigh scattering originates from density fluctuations in the glass present at the moment of solidification and as a consequence has a random nature. In an interferometric set up the Rayleigh signal at a particular wavelength is a summation of all reflections along the length of the fiber. In the summation, the accumulated phase delay of each of the contributions is taken into account. This gives rise to a spiky nature of the interferometric spectrum. Its Fourier transform will also be spiky with a characteristic length scale δl that is a fraction of the wavelength in the glass. Fourier transformed spectrum however has a step size length Δz between consecutive points probed along the fiber of:

$$\Delta z = \frac{\lambda_b^2}{2n\Delta\lambda} \quad (1)$$

Here n is the group refractive index of the optical mode in the fiber. The characteristic coherence length δl (estimated to be on the same order of magnitude as the period probed i.e. $\lambda/2n=500$ nm) of the Rayleigh scattering is much smaller than the step size length Δz (approximately 40 µm or micrometer). FIG. 1 displays the phase of a measured and Fourier transformed Rayleigh signal. The phase is completely random even at length scales of a step size. Luckily, it reproduces so that phase tracking with respect to a reference signal is possible. FIG. 1 does, however, reveal that minute shifts in length will completely destroy the coherence of the phase difference between shape measurement and reference.

Fiber Bragg Gratings

The solution to the above mentioned problems is to use an extrinsic scattering signal by writing Bragg gratings in the 4 cores of the sensing fiber. The scattering efficiency can be around 1% in magnitude, which is to be compared to the $10^{-8}$ of Rayleigh scattering (see Annex I). The signals of the interferometer will increase by the square root of this ratio, i.e. $10^3$ or 60 dB. Termination of a shape sensing fiber needs only a small amount of suppression of the end reflection, so that e.g. an 8 degree angle polished cut will suffice. All issues concerning cross talk between fiber cores, finite rejection ratio of the circulator, reflections due to multi-core connectors are mitigated. Furthermore, the lead wires will have a negligible signal with respect to the shape sensing fiber. Increasing lead wire length can easily be compensated by adding equal amount of fiber length in the reference arm of the interferometer without deterioration of the integrity of the phase measurement.

U.S. Pat. No. 7,781,724 is an example of a shape/position sensing device using fiber Bragg gratings. The device comprises an optical fiber means. The optical fiber means comprises either at least two single core optical fibers or a multi-core optical fiber having at least two fiber cores. In either case, the fiber cores are spaced apart such that mode coupling between the fiber cores is minimized. An array of fiber Bragg gratings (FBGs) are disposed within each fiber core and a frequency domain reflectometer is positioned in an operable relationship to the optical fiber means. In use, the device is affixed to an object. Strain on the optical fiber is measured and the strain measurements correlated to local bend measurements. Local bend measurements are integrated to determine position and/or shape of the object. An inherent disadvantage is that for typical FBG configurations, the detector of the reflectometer must have a relatively large dynamic range to encompass the information in the 'wings' of the spectral band.

The inventors of the present invention has appreciated that an improved shape and/or position sensing system is of benefit, and has in consequence devised the present invention.

SUMMARY OF THE INVENTION

It would be advantageous to achieve an improved shape and/or position sensing system. It would also be desirable to enable a more stable and/or reliable shape and/or position sensing system. In general, the invention preferably seeks to mitigate, alleviate or eliminate one or more of the above mentioned disadvantages singly or in any combination. In particular, it may be seen as an object of the present invention to provide a method that solves the above mentioned problems, or other problems, of the prior art.

To better address one or more of these concerns, in a first aspect the invention relates to an optical sensing system for determining the position and/or shape of an associated object, the system comprising;

one or more optical fibers for spatial fixation on, in, or to said associated object, each optical fiber having one or more optical fiber cores, a plurality of optical fiber cores having one or more fiber Bragg gratings (FBG) extending along the full length of said optical fiber cores where the position and/or shape is be to determined of said object, a reflectometer optically connected to said one or more optical fibers, the reflectometer being optical arranged for measuring the strain at a number of sampling points along the plurality of optical fiber cores, a processor operably connected to the reflectometer for determining the position and/or shape of the object based on said measured strains from the plurality of optical fiber cores, wherein the reflectometer, when working in the frequency domain, is arranged for performing a wavelength scan from a first wavelength to a second wavelength around a central wavelength for the determining said position and/or shape, the one or more fiber Bragg gratings (FBGs) extending along the full length of said optical fiber cores, each of the one or more optical fiber core having a spatially modulated reflection (r) along the said full length of the optical fiber core so that the corresponding reflection spectrum is detectable in said wavelength scan.

The invention is particularly, but not exclusively, advantageous for obtaining an optical system where the Fiber Bragg grating(s) may be effectively continuous along the optical fiber leaving no gaps so that every position gives rise to a detectable reflection, and achieving that the reflection spectrum may encompass a wavelength span equaling the wavelength scan, or 'sweep', of an optical source in the reflectometer.

Within the context of the present invention, the associated object may be e.g. a medical catheter that may be manufactured integrally with the optical sensing system according to the present invention, or, alternatively, it may be mechanically fixated to the optical sensing system.

The principal property of a FBG is the ability to reflect light at certain wavelengths. In some applications, the satisfactory performance of a grating assumes that its reflectivity, r, is not small. This condition places a lower limit to the FBG length, index modulation amplitude and also the upper limit to its possible chirp. A fiber Bragg grating (FBG) may, in the context of the present invention, be defined as a kind of distributed Bragg reflector implemented in an optical core, or a segment, of an optical fiber in such a manner that the FBG will reflect certain wavelengths, and transmitting others. This may be understood intuitively as an interference phenomenon between the incoming optical wave and the grating, the incoming optical experiencing destructive optical interference in the forward direction, and constructive interference in the backwards direction, hence the incoming optical wave with the resonance wavelength is interacting with the FBG and it is reflected. Notice that one optical fiber may have one fiber core, or several optical fiber cores. The cores need not be in a central position of the optical fiber, but it can, as a special case, have one core a central position (i.e. along a central axis) of the optical fiber.

FBGs may be applied in several ways within the context of the present invention. A non-exhaustive list includes chirped FBGs (linear and non-linear), anodized FBGs, tilted FBGs, superstructure grating FBGs, etc.

Within the context of the present invention, it may be understood that the meaning of the term 'full length' is to be interpreted as the active or displaceable portion of the optical fiber cores, where the shape and/or position is desired (and therefore of the interconnected associated object). Hence, the optical fiber cores can have one or more portions without any FBGs if appropriate within the context.

Within the context of the present invention, it may also be understood that the meaning of the reflection (r) being 'spatially modulated along the said full length of the optical fiber core' is to be interpreted as being modulated along the full length when being viewed on the order of a wavelength divided by twice the refractive index ($\lambda/2n$). Thus, on (significant) smaller scales, the reflection may not be modulated due to the absence of e.g. a taper function, as a person skilled in the art will understand it.

In one embodiment, the at least one optical fiber core (10) may have a single fiber Bragg grating (FBG, 8) extending along the said full length where the position and/or shape is be to determined of said object, possibly more than one optical fiber core may have a FBG extending along the length. This is a so-called in-homogenous solution within the context of the present application, and is a particular advantageous solution amongst other things due to relative ease of manufacturing. In a further embodiment, the single fiber Bragg grating may be chirped in a plurality of regions along the said full length so that every sampling point in the optical core has an effective, separate resonance wavelength, each sampling point being detectable in said wavelength scan. Notice that the chirping, i.e. change in periodicity of the grating, may be linear or non-linearly. In one embodiment, the said plurality of regions may be partly overlapping each other, the overlap region may be approximately the same size or it may vary from one overlapping region to the next region. The overlap may advantageously increase stability of the strain measurements because possible gaps between the gratings are avoided or minimized.

In one advantageous solution, the single fiber Bragg grating (9) may be linearly chirped in the plurality of regions along the said full length. Possible, just a fraction of the regions are linearly chirped.

Preferably, the chirping length within the said regions is chosen so that the corresponding coherence length of the phase is longer than the step length ($\Delta z$) between consecutive sampling points because this will significantly reduce sensitivity to vibrations and/or temperature fluctuations, e.g. more than one order of magnitude as explained in more detail below.

In another embodiment of the present invention, at least one optical core may have a plurality of fiber Bragg gratings (FBG) extending along the full length, each fiber Bragg grating having a resonance wavelength different from the other fiber Bragg gratings, each grating corresponding to a sampling wavelength, or optical frequency. This embodiment is known as the so-called homogenous solution within the context of the present application.

In one particular embodiment, the system may be arranged for sensing a position and/or a shape in N dimensions, the plurality of optical fiber cores (9) being equal to N+1 so as to allow for temperature compensation and/or elongated strain, using the additional optical fiber core.

In another embodiment, the plurality of optical fiber cores may be positioned within one optical fiber, the optical fiber cores being helically twisted around a central optical fiber core for shape and/or position determination.

Various applications may be contemplated within the teaching and context of the present invention, and a non-exhaustive list of associated objects may include a medical catheter, a medical inspection probe, a medical sensor, a building inspection sensor, a submarine sensor, a geological sensor.

In a second aspect, the present invention relates to a method for determining the position and/or shape of an associated object (O), the method comprising;

providing one or more optical fibers for spatial fixation on, in, or to said associated object (O), each optical fiber having one or more optical fiber cores, providing a plurality of optical fiber cores having one or more fiber Bragg gratings (FBG) extending along the full length of said optical fiber cores where the position and/or shape is be to determined of said object (O), providing a reflectometer (REFL) optically connected to said one or more optical fibers, the reflectometer being optical arranged for measuring the strain at a number of sampling points along the plurality of optical fiber cores, and providing a processor (PROC) operably connected to the reflectometer for determining the position and/or shape of the object based on said measured strains from the plurality of optical fiber cores, wherein the reflectometer, when working in the frequency domain, is arranged for performing a wavelength scan from a first wavelength to a second wavelength around a central wavelength ($\lambda_0$) for the determining said position and/or shape, the one or more fiber Bragg gratings (FBG) extending along the full length of said optical fiber cores, each of the one or more optical fiber core having a spatially modulated reflection (r) along the said full length of the optical fiber core so that the corresponding reflection spectrum is detectable in said wavelength scan.

In a third aspect, the present invention relates to an optical unit to be applied in an associated optical sensing system for determining the position and/or shape of an associated object (O), the optical unit comprising;

one or more optical fibers for spatial fixation on, in, or to said associated object (O), each optical fiber having one or more optical fiber cores, and a plurality of optical fiber cores having one or more fiber Bragg gratings (FBG) extending along the full length of said optical fiber cores where the position and/or shape is be to determined of said object (O), where the optical unit is connectable to an associated reflectometer (REFL), the reflectometer being optical arranged for measuring the strain at a number of sampling points along the plurality of optical fiber cores, an associated processor (PROC) further being connectable to the reflectometer for determining the position and/or shape of the object based on said measured strains from the plurality of optical fiber cores, wherein the reflectometer, when working in the frequency domain, is arranged for performing a wavelength scan from a first wavelength to a second wavelength around a central wavelength ($\lambda_0$) for the determining said position and/or shape, the one or more fiber Bragg gratings (FBG) extending along the full length of said optical fiber cores, each of the one or more optical fiber core having a spatially modulated reflection (r) along the said full length of the optical fiber core so that the corresponding reflection spectrum is detectable in said wavelength scan. Thus, the optical unit may comprise one or more optical fibers.

In fourth aspect, the present invention may further relate to an optical sensing system for determining the position and/or shape of an associated object, the system comprising; one or more optical fibers for spatial fixation on, in, or to said associated object, each optical fiber having one or more optical fiber cores, like in the first aspect of the present invention, but with only one optical fiber core having one or more fiber Bragg gratings (FBG) extending along the full length of said optical fiber cores where the position and/or shape is be to determined of said object.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DETAILED DESCRIPTION OF EMBODIMENTS

Figure 10:
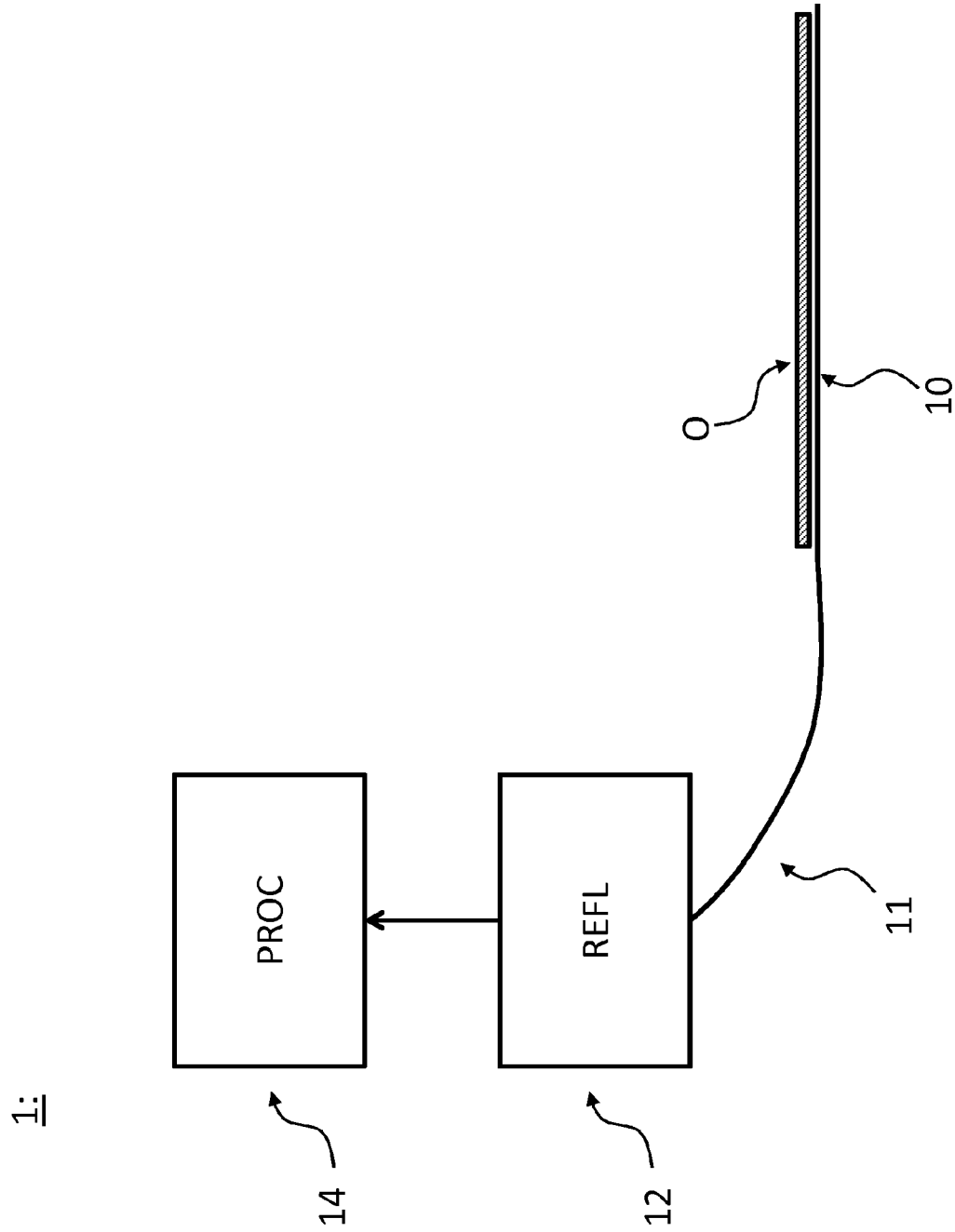
FIG. 10 shows a schematic illustration of an optical position and/or shape sensing system according to the present invention.

FIG. 10 shows a schematic illustration of an optical position and/or shape sensing system 1 according to the present invention. The optical sensing system 1 is adapted for determining the position and/or shape of an associated object O. The system comprises one or more optical fibers 10 for spatial fixation on, in, or to said associated object O, each optical fiber having one or more optical fiber cores, cf. FIG. 11 and forwards.

Furthermore, a plurality of optical fiber cores, not shown here, have one or more fiber Bragg gratings (FBG) extending along the full length of said optical fiber cores where the position and/or shape is be to determined of said object O.

A reflectometer REFL 12 is optically connected, e.g. via auxiliary optical fiber 11 adapted for that purpose, to said one or more optical fibers 10, the reflectometer 12 being optical arranged for measuring the strain at a number of sampling points along the plurality of optical fiber cores. Possibly, more than one auxiliary optical fiber 11 may applied, cf. e.g. U.S. Pat. No. 7,781,724 for further details regarding this aspect of the invention.

A processor PROC 14 is operably connected to the reflectometer 12 for determining the position and/or shape of the object O based on said measured strains from the plurality of optical fiber cores (not shown here).

The reflectometer 12, when working in the frequency domain, is arranged for performing a wavelength scan from a first wavelength ($\lambda_1$) to a second wavelength ($\lambda_2$) around a central wavelength ($\lambda_0$) for the determining said position and/or shape, the one or more fiber Bragg gratings (FBG) extending along the full length of said optical fiber cores, each of the one or more optical fiber core having a spatially modulated reflection (r) along the said full length of the optical fiber core so that the corresponding reflection spectrum is detectable in said wavelength scan, e.g. from $\lambda_1$ to $\lambda_2$, also called $\Delta\lambda$ in the following.

Figure 11:
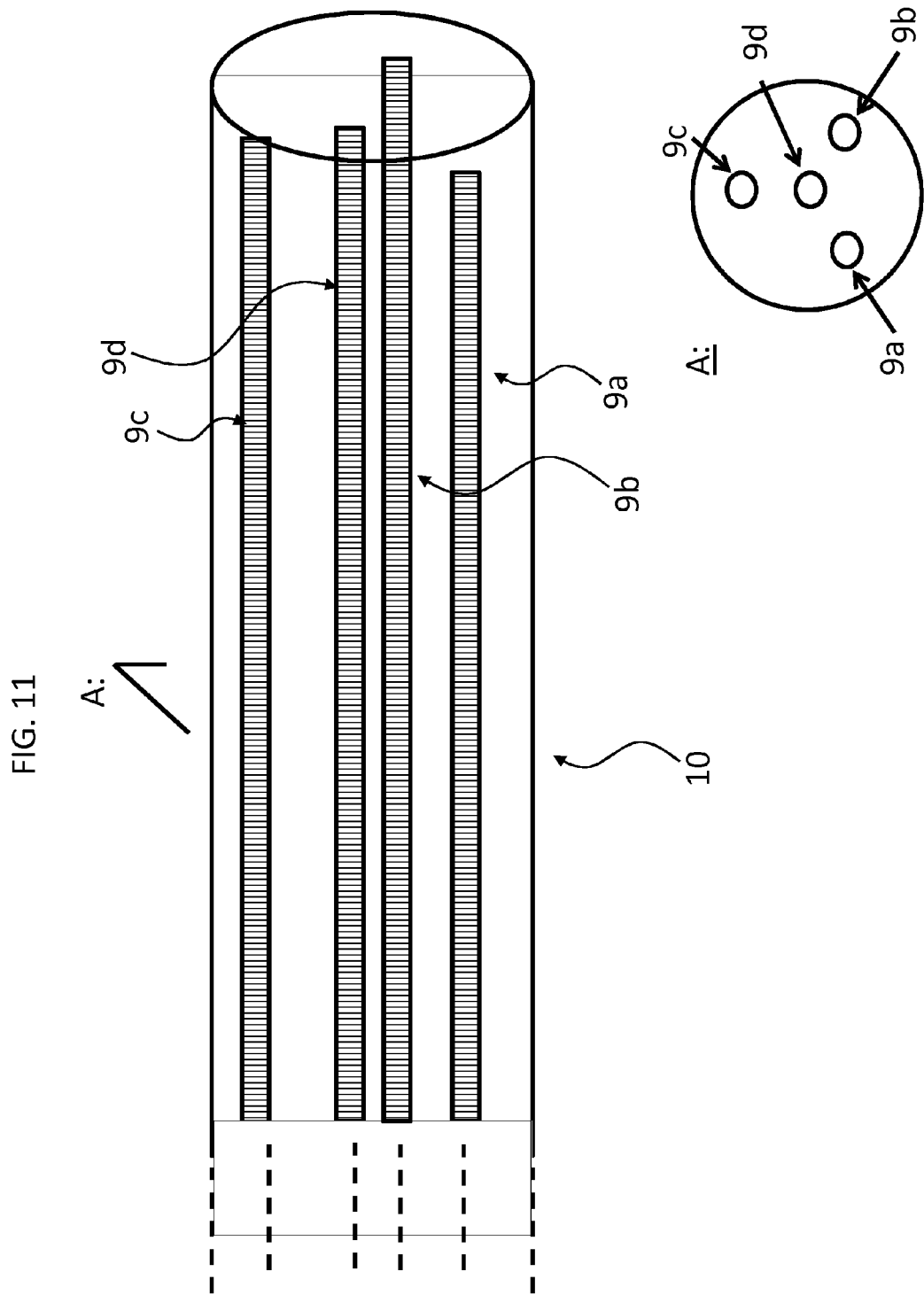
FIG. 11 shows a schematic perspective illustration of an optical fiber with optical fiber cores according to the present invention.

FIG. 11 shows a schematic perspective illustration of an optical fiber 10 with four optical fiber cores 9a, 9b, 9c, and 9d according to the present invention. As indicated by the vertical pattern fill, the cores 9 have one or more FBGs along the full length (the left side end portion not being shown as indicated by the broken lines).

As explained in Annex III, there are generally homogeneous and inhomogeneous solutions for the reflection r along the full length of the optical fiber core 9.

For the inhomogeneous solution, wherein at least one optical fiber core 9 that has a single fiber Bragg grating (FBG) extending along the said full length where the position and/or shape is be to determined of said object O.

For the homogeneous solution, at least one optical core 9 has a plurality of fiber Bragg gratings (FBG) extending along the full length, each fiber Bragg grating having a resonance wavelength different from the other fiber Bragg gratings.

It is envisioned that a combination of the inhomogeneous solution and inhomogeneous solution may be implemented as well. Of course, the reflectometer should be correspondingly adapted.

In FIG. 11, and the following figures, the optical cores 9 are shown to be parallel with a central axis of the optical fiber 10, but in some embodiments, the optical cores may be arranged otherwise. In one preferred embodiment, number of optical cores 9 is four and they are arranged with a central optical core 9d being parallel to the optical fiber 10 and the other three cores 9 are helically twisted around the said central core (not shown).

FIG. 11 depicts four cores 9a, 9b, 9c, and 9d in the fiber 10. As shown in FIG. 11, the cores 9 run parallel with the center of the fiber. With such an arrangement one can actually only measure transverse bend in x and y direction, but cannot measure/compensate for strain nor for twisting/torquing of the fiber. However, if the three cores 9a, 9b, and 9c are also twisted around the central core 9d it is possible to measure these properties as well. This is however not shown for clarity in FIG. 11, nor in the other figures. In the transverse cross-sectional drawing A, the relative positions of the cores 9 are shown.

Figure 12:
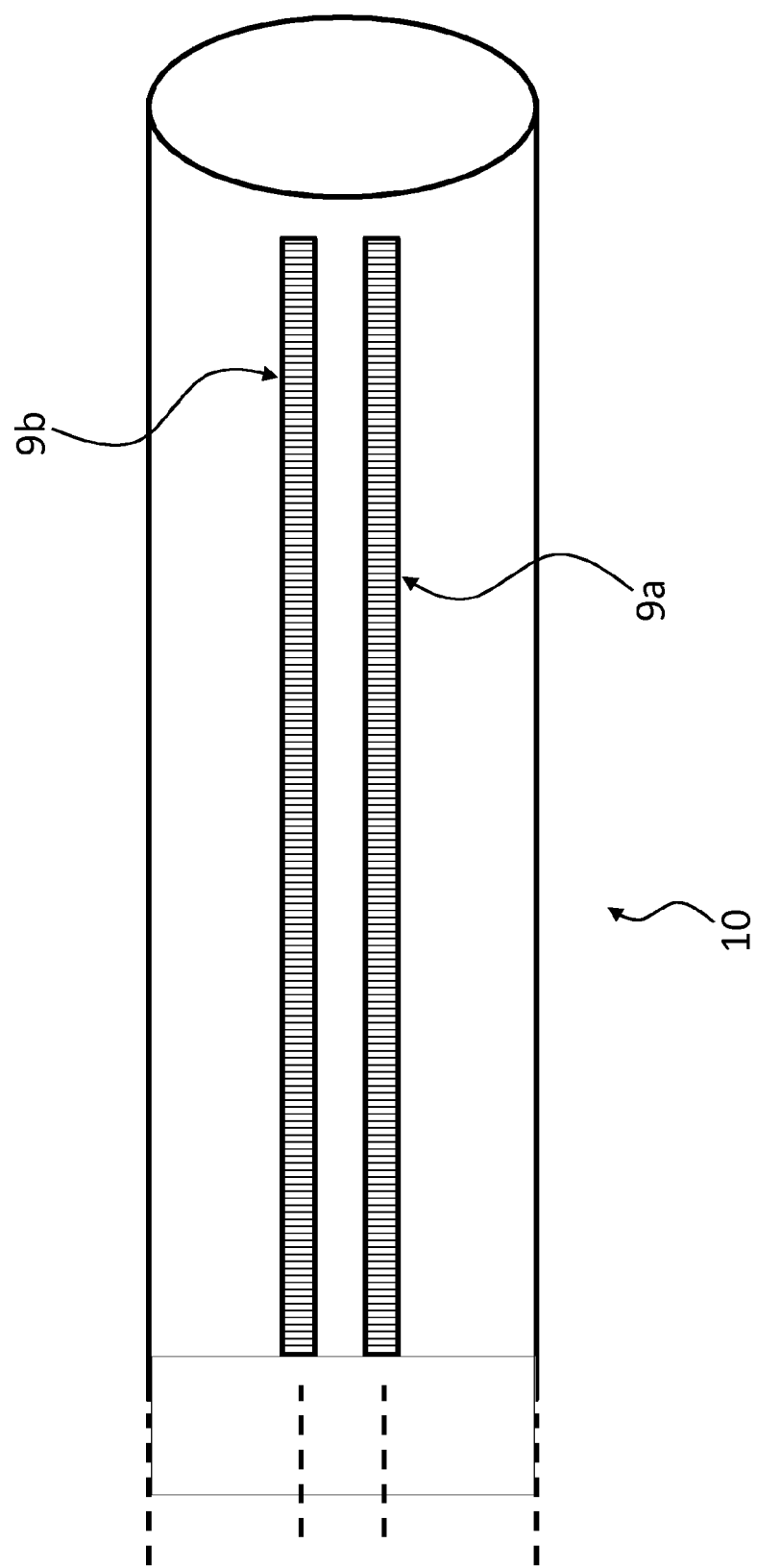
FIGS. 12-14 show schematic cross-sectional illustrations of various embodiments with optical fiber(s) with optical fiber cores according to the present invention.
Figure 13:
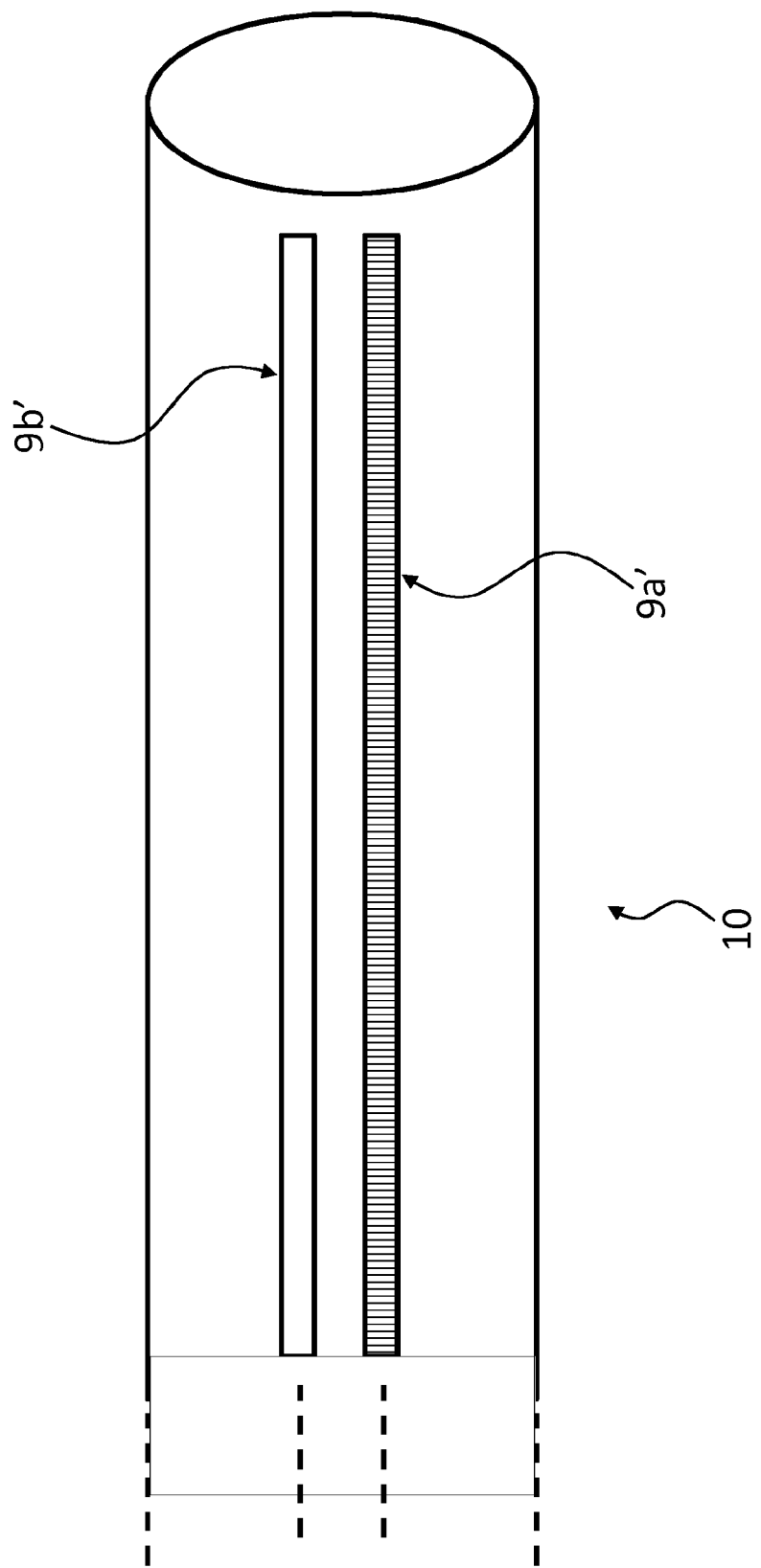
Figure 14:
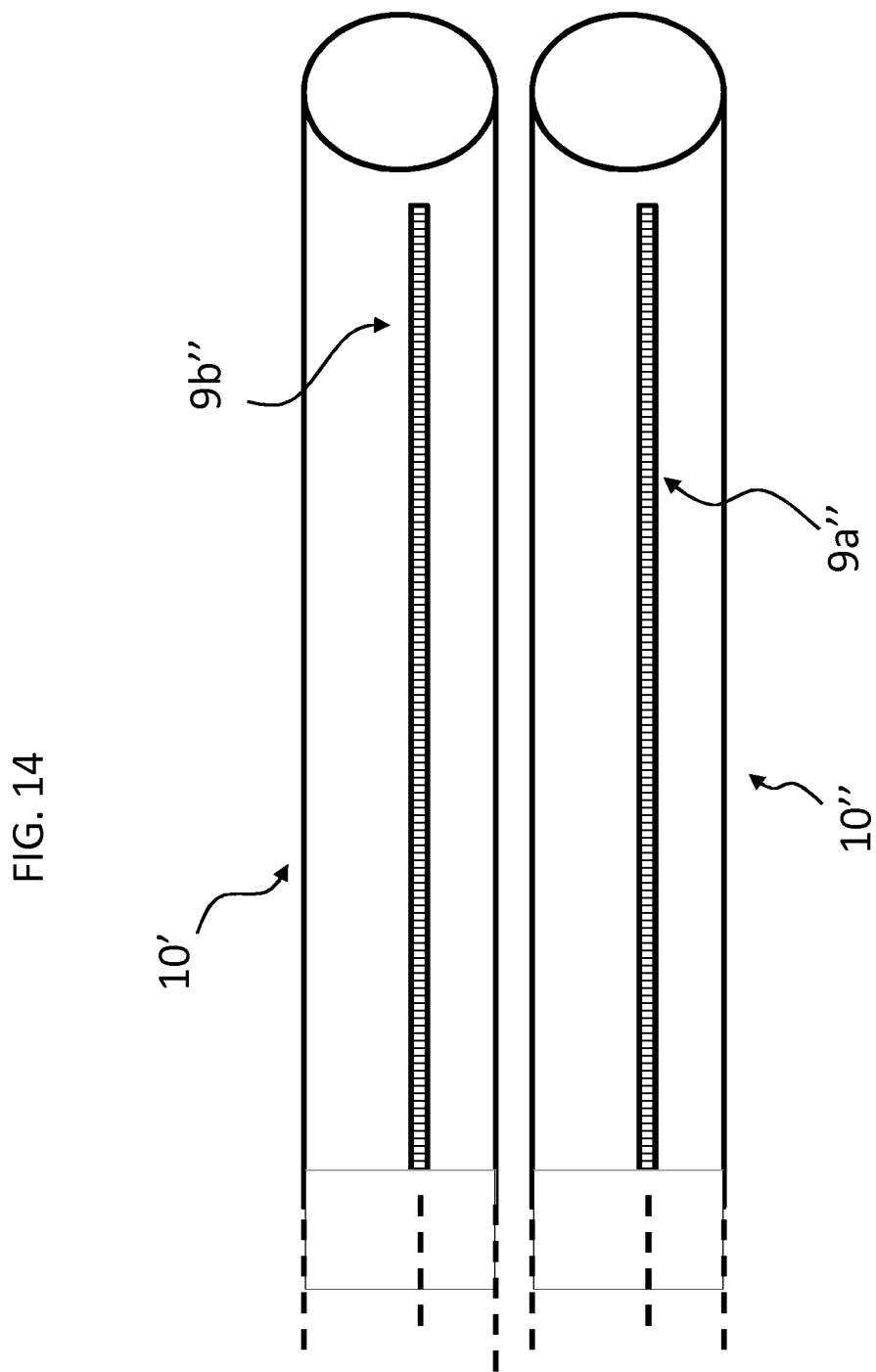

FIGS. 12-14 show schematic illustrations of various embodiments with optical fiber(s) with optical fiber cores according to the present invention.

In FIG. 12, an optical fiber 10 with two optical cores 9a and 9b are shown. For some type of sensing this may be sufficient, e.g. one-dimensional displacements, the additional core being used for temperature compensation.

In FIG. 13, another optical fiber 10 with two optical cores 9a' and 9b' are shown. As schematically indicated only optical core 9a' has one or more FBSs along the length (vertical pattern fill), whereas the other optical core 9b' applies another kind of reflection, e.g. Rayleigh scattering. Thus, in a separate aspect of the present invention, only one optical core 9a' has FBG(s), which may be combined with another kind of sensing technique via optical reflection sensible to strain. In a particular embodiment, the optical core 9a' may also work independent or without the other optical core.

In FIG. 14, a particular embodiment is shown where the optical cores 9a" and 9b" are positioned in separate optical fibers 10' and 10". This may of course be further generalized to any combination of optical fibers 10, each fiber having one or more optical cores 9, e.g. 2 optical fibers, each with two optical cores (not shown).

Figure 15:
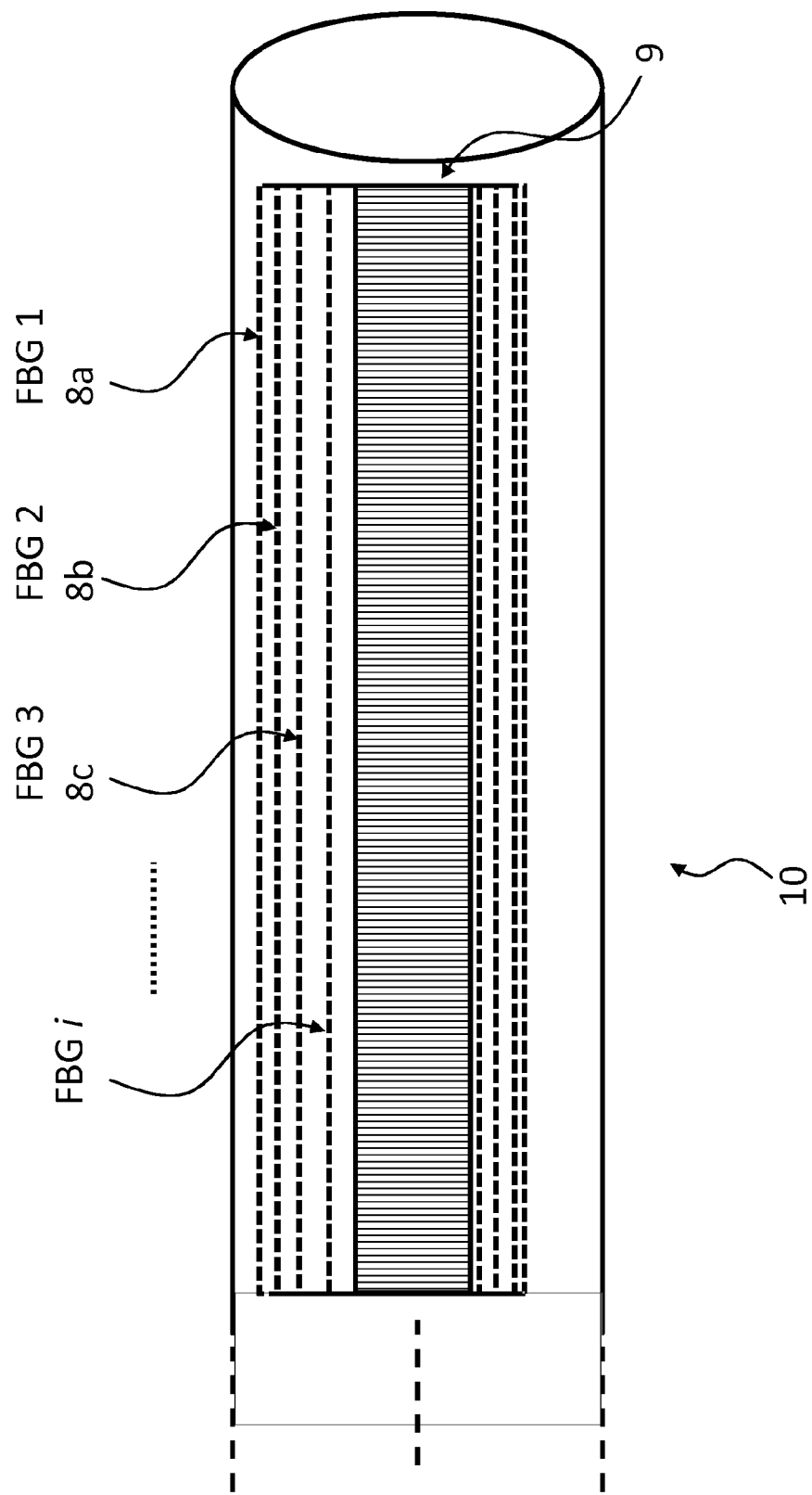
FIGS. 15-17 show schematic cross-sectional illustrations of various embodiments with optical fiber cores with FBGs according to the present invention.
Figure 16:
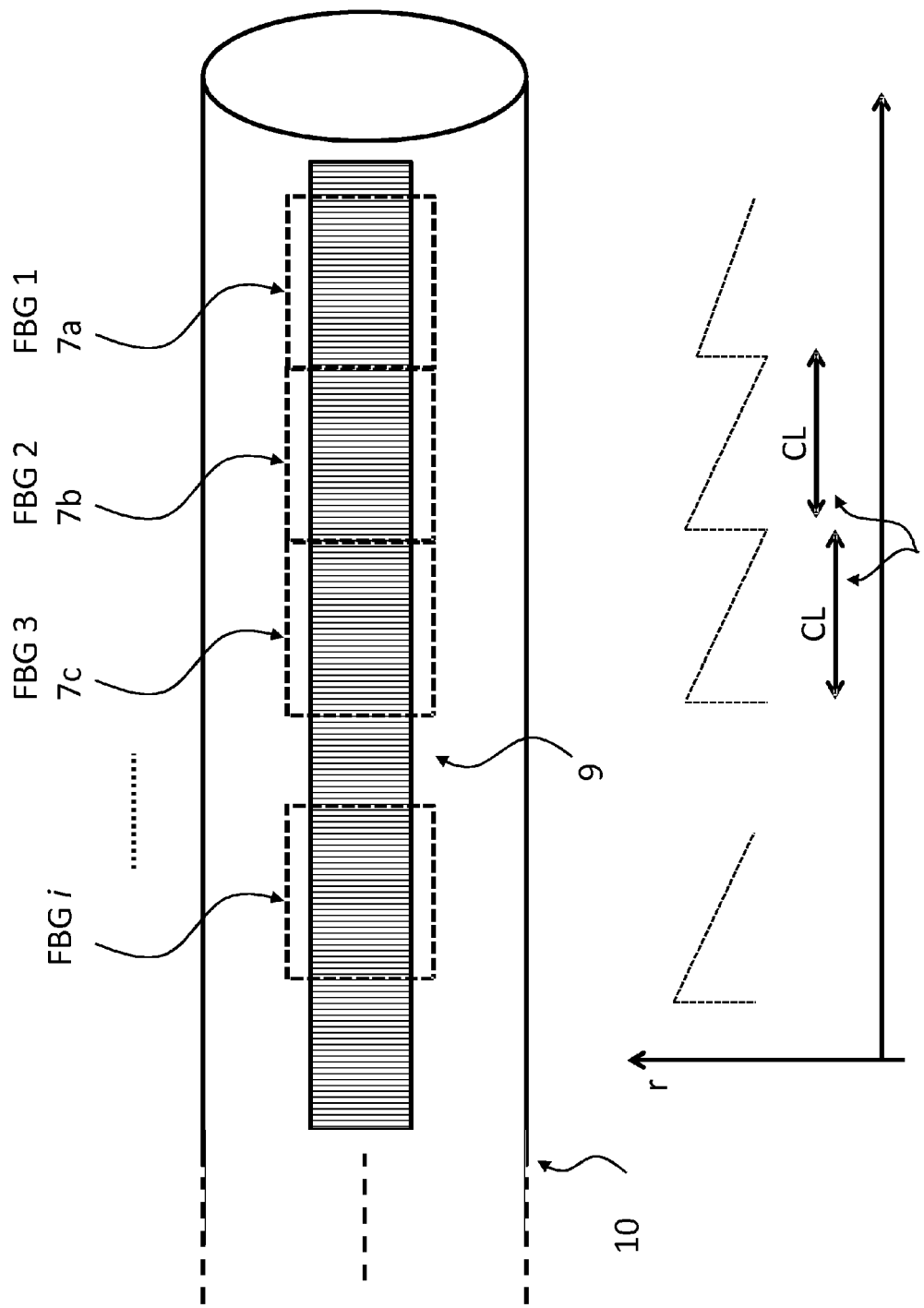
Figure 17:
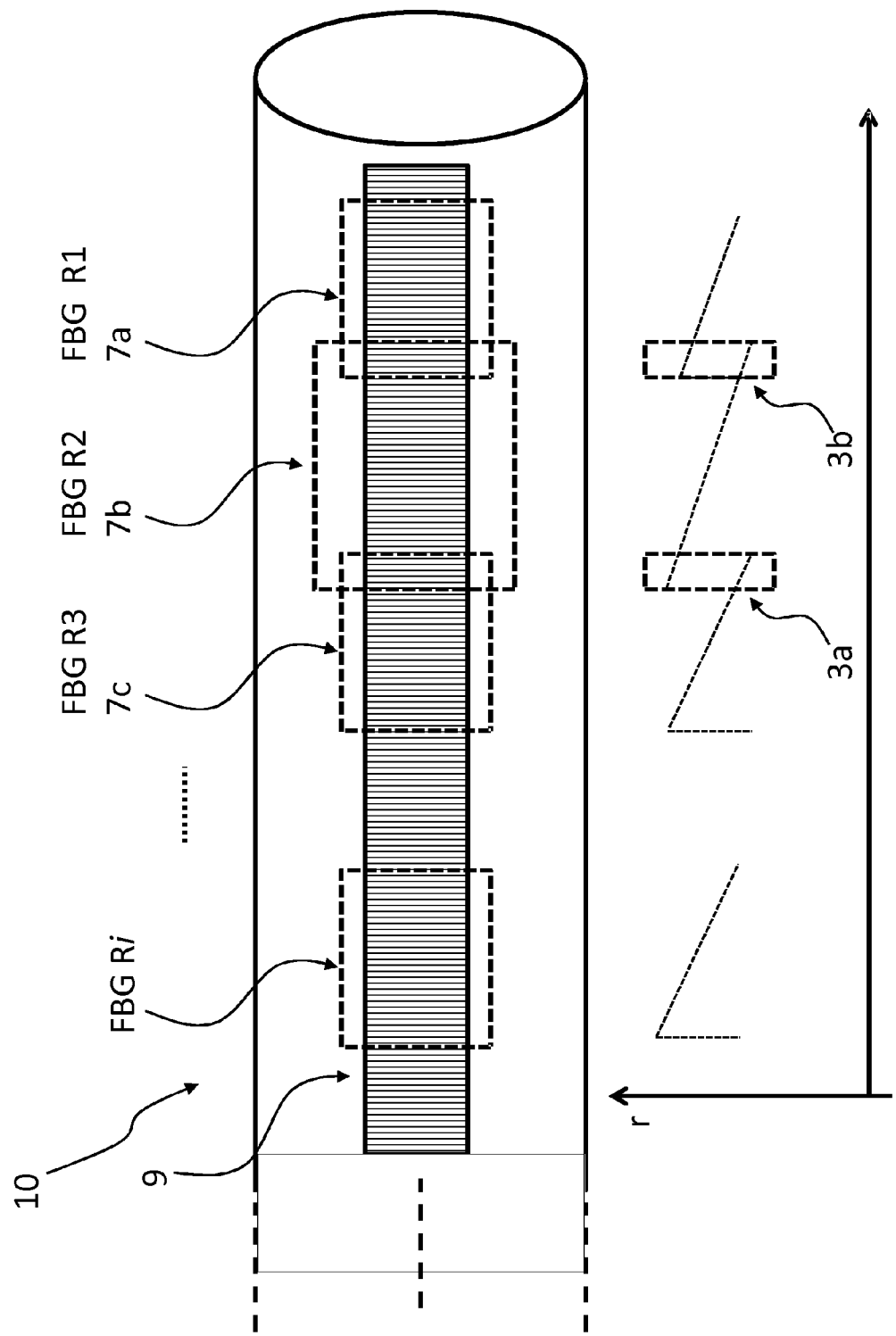

FIGS. 15-17 show schematic illustrations of various embodiments with optical fiber cores with FBGs according to the present invention.

In FIG. 15, the above-mentioned homogeneous solution is schematically shown where an array of overlapping Fiber Bragg gratings 8a FBG 1, 8b FBG 2, 8c FBG 3 ... FBG i are shown, cf. also Annex III below for a more detailed explanation. For a realistic optical fiber, the number of gratings will typically be around 10.000 rendering this solution somewhat complex but not impossible with the current technology, and hence within the scope and teaching of the present invention. The homogeneous case depicted in FIG. 15 thus show completely overlapping gratings where each of them has the full fiber length and each its own periodicity. This may be said to mimic a similar situation as in Rayleigh scattering, but made artificially. One could graphically represent this by a set of vertical lines that have an irregular random spacing with a specific average spacing. This is however not done in FIG. 15 for reason of clarity In FIG. 16, the inhomogeneous solution of adjacent Fiber Bragg gratings regions 7a FBG R1, 7b FBG R2, 7c FBG R3 ... FBG Ri are shown. Each grating region has its own resonance wavelength covering the full span of the detuning region. In this particular embodiment, the grating regions have a grating periodicity (Λ) which is linearly changing i.e. it is chirped, from high to low, high to low, etc. along the length of the optical fiber 10 (from left to right). This is schematically indicated for the reflectivity r in the graph immediately below the optical fiber 10. Notice that the scale of the graph is exaggerated for clarity, in reality it is a small perturbation as explained in Annex III below.

FIG. 16 displays chirped gratings that are not overlapping. One may add for completeness sake an additional embodiment that may be a series of non-chirped gratings adjacent to one another each with a different resonance wavelength. In this way, a wavelength span can also be covered. It needs a significant number of masks, so it may be performed with an interferometer manufacturing method, or other appropriate manufacturing.

Thus, the single fiber Bragg grating 9 is chirped in a plurality of regions R1, R2, R3, ... Ri along the full length so that every sampling point in the optical core has an effective, separate resonance wavelength, each sampling point being detectable in said wavelength scan. By separate it is understood that they are distinguishable from neighboring peaks in the scan. Any kind of chirping fulfilling this requirement may be applied for varying the periodicity.

The sampling points may be distributed with an approximate spacing, $\Delta z$, of 10, 20, 30, 40, 50, 60, 70, 80, 90, or 100 micrometers (μm).

It is also indicated how the chirping length CL 6 within the said regions R2 and R3 is defined, and the chirping length CL is advantageously chosen so that the corresponding coherence length of the phase is longer than the step length $\Delta z$ between consecutive sampling points. This will significantly reduce noise and temperature influence as demonstrated in Annex II below in more details. The chirping length 6 is typically equal for the different grating regions R1 to Ri, but it is also contemplated that is could be different.

FIG. 17 shows an embodiment similar to FIG. 16, but where the plurality of regions R1 to Ri along the length of the optical core 9 are partly overlapping each other as schematically indicated with FBG R2 overlapping with FBG R1 and FBG R3 on either side, respectively. In the graph below the optical fiber 10, the overlapping regions 3a and 3b are indicated to show that the reflectivity and hence resonance wavelength will be different for the two interleaved gratings in 3a and 3b. This can generally be accomplished with an odd chirping function, but in this embodiment it is shown for linear chirping. Notice that the overlapping range is typically relative small (1/1000 of the optical fiber length) but it shown here larger for clarity.

Figure 18:
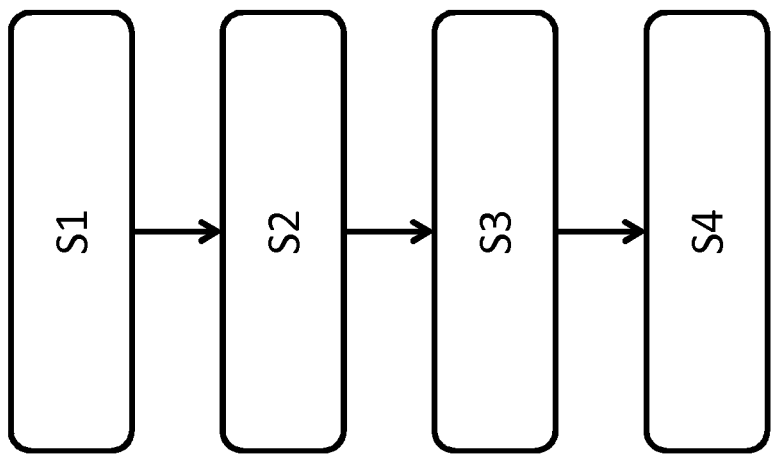
FIG. 18 shows a flow-chart for method according to the present invention.

FIG. 18 shows a flow-chart for method according to the present invention; a method for determining the position and/or shape of an associated object O, the method comprising;
S1 providing one or more optical fibers 10 for spatial fixation on, in, or to said associated object O, each optical fiber having one or more optical fiber cores 9,
S2 providing a plurality of optical fiber cores having one or more fiber Bragg gratings FBG 8 extending along the full length of said optical fiber cores 9 where the position and/or shape is be to determined of said object O,
S3 providing a reflectometer REFL, 12 optically connected to said one or more optical fibers 10, the reflectometer being optical arranged for measuring the strain at a number of sampling points along the plurality of optical fiber cores, and
S4 providing a processor PROC, 14 operably connected to the reflectometer for determining the position and/or shape of the object based on said measured strains from the plurality of optical fiber cores,
wherein the reflectometer, when working in the frequency domain, is arranged for performing a wavelength scan from a first wavelength to a second wavelength around a central wavelength $\lambda_0$ for the determining said position and/or shape, the one or more fiber Bragg gratings FBG 8 extending along the full length of said optical fiber cores 9, each of the one or more optical fiber cores having a spatially modulated reflection r along the said full length of the optical fiber core so that the corresponding reflection spectrum is detectable in said wavelength scan.

Usually Bragg gratings are written in a fiber core using UV light and a phase mask. The finite length of the phase mask gives rise to the same finite length of the grating. This length will be a few cm large and will not be as large as the full length of the sensing fiber. Therefore, multiple gratings should be written in such a way that they are concatenated or overlapping so that the signal as function of fiber position does not reveal any gaps. Cf M. Sumetsky et al., "*Holographic methods for phase mask and fiber grating fabrication and characterization*" for further details relevant for the skilled person for the manufacturing of FBGs.

In order to obtain a good spatial resolution (e.g. 40 micron) a corresponding spectral band width has to be scanned (e.g. 20 nm). A Bragg grating continuous over a sensing fiber of 1 m length will give rise to a very sharp spectral peak much smaller than 20 nm. Phase jumps between the consecutive gratings will broaden the spectrum but the spectral width of the unstrained fiber will still be much lower than 1 nm. In order to obtain the information in the wings of the spectral band where signal levels are small the detectors need to have a large dynamic range. To alleviate this problem it is better to chirp the grating(s) so that almost the complete measured spectral band is filled. Due to curvature of the sensing fiber strain will ensue and consequently the reflection spectrum will shift. The shift will be a few nm at largest. During interrogation the scan range should encompass not only the unstrained spectral reflection band, but also the addition possible shifts owing to strain.

Figure 1:
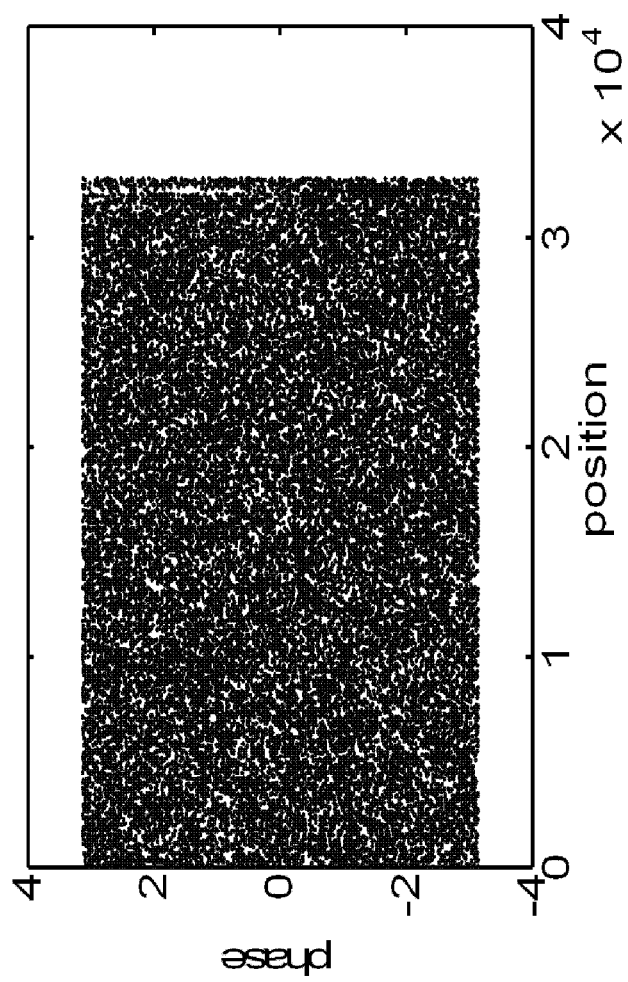
FIG. 1 shows the phase of a Fourier transformed spectrum from an interferometer as a function of position along the fiber for a Rayleigh signal. The position is given in fiber index numbers.
Figure 2:
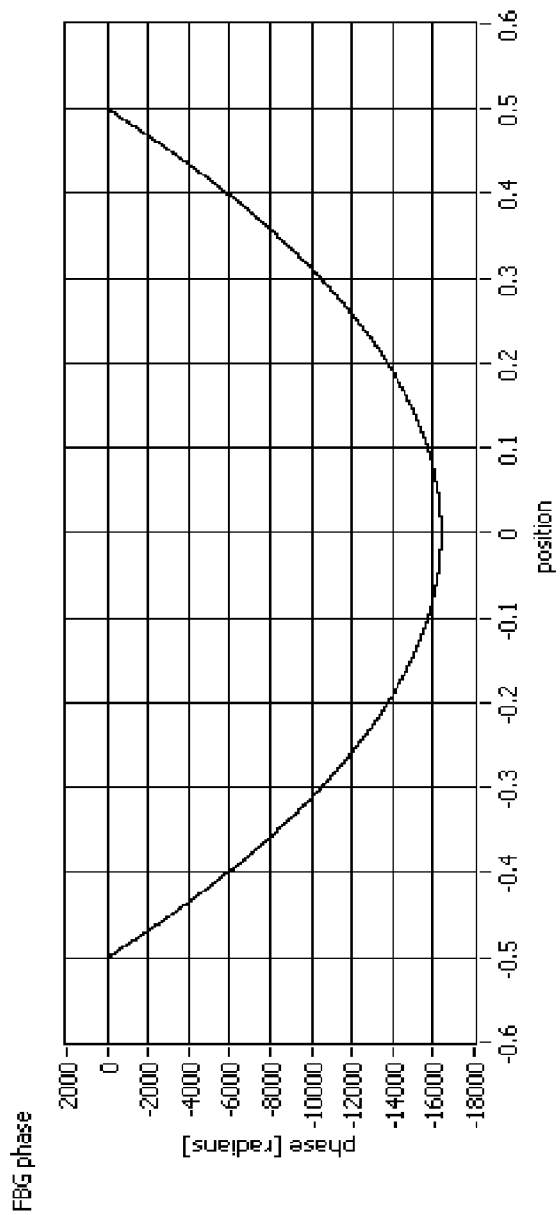
FIG. 2 shows the phase of a single fiber Bragg grating with a linear chirp as a function of position.

Owing to the chirp of the grating the phase of the reference measurement will not be constant but exhibit a functional dependence corresponding to the chirp. For a linear chirp the phase function will be quadratic. An example of this is given in FIG. 1. Although the total span of the phase is substantial the function is continuous and not completely random as for Rayleigh scattering. The length scale of the variation corresponds to the spectral band of the chirp. Chirping over less than 20 nm will correspond to a coherence length of the phase of more than 40 micron, i.e. more than the step length between consecutive measurement points. Consequently, the sensitivity to vibrations and temperature fluctuations is reduced by much more than an order of magnitude. In Annex II "Experimental data of phase signals form fiber Bragg gratings" experimental proof is given of the robustness of the phase signal from FBGs regarding positional shifts viz. vibrations.

The present invention proposes amongst others a fiber with multiple cores each having a single chirped Bragg grating. The advantage of the chirp is that the spectral band needed for the spatial resolution is more or less evenly filled. Such fiber can be used for optical shape sensing.

The present invention proposes amongst others a fiber with a single core that has a plurality of chirped Bragg gratings, whereby there is no gap between the gratings. The advantage of the chirp is that the spectral band needed for the spatial resolution is more or less evenly filled and the advantage of not having a gap is that all locations along the core can be scanned. Such a single core fiber can be used in applications where a distributed temperature and/or strain profile is monitored in an interferometric way. In an improvement, the invention proposes a core with overlap of two consecutive Bragg gratings. The overlap makes that such a core allows scanning of a location that has been moved outside the area of one grating due to strain.

An embodiment of a device according to the invention comprises:

A shape sensing multi-core fiber with a central core and at least 3 outer cores helically winded around the central core;

An interrogation unit to deliver light to the shape sensing fiber and detect the reflected signals from the Bragg gratings in a interferometric way;

A processing unit and accompanying algorithm that translates the measured reflection spectra into shape, characterized in that:

All cores of the fiber contain at least one Bragg grating;

Within each of the cores the grating(s) is (are) written in a continuous fashion so that no gaps arise in the signal as function of position;

Within each of the cores the spectrum of the Bragg grating(s) have a spectral band width closely corresponding to the needed spatial resolution;

In case a plurality of similar chirped gratings is employed, consecutive gratings are preferably overlapping in the spatial domain while the resonance frequency bands in the overlap correspond to the two opposite wings of the spectral band.

As explained in Annex III named "*Theoretical framework of fiber Bragg gratings*", there are an unlimited amount of ways in which a single or a series of fiber Bragg gratings can be designed fulfilling the two requirements of our insight: i.e. 1) the grating(s) should be continuous along the fiber leaving no gaps so that every position gives rise to a detectable reflection, 2) the total reflection spectrum should encompass a wavelength span equaling the sweep scan size of the optical source. The scan size is determined by the resolution needed for proper shape sensing as given by Eq. (1). Typical values are 20 nm wavelength span around a central wavelength of 1540 nm will correspond to a step size of 40 micron in real space.

Without being far from complete we will give now an example that fulfils the above given two requirements. The design constitutes 40 gratings with equal chirp and equal center wavelength. For a 1 m length of fiber the grating size is thus 25 mm, which is a typical value for the size of a phase mask during the grating writing process. The gratings have a small overlap of 0.001 times the length of the sensing fiber, i.e. when the fiber is 1 m long this overlap is 1 mm. Each of the gratings has a linear chirp, which means a quadratic dependence of phase on position and an absolute phase of the periodicity that is chosen randomly.

Figure 3:
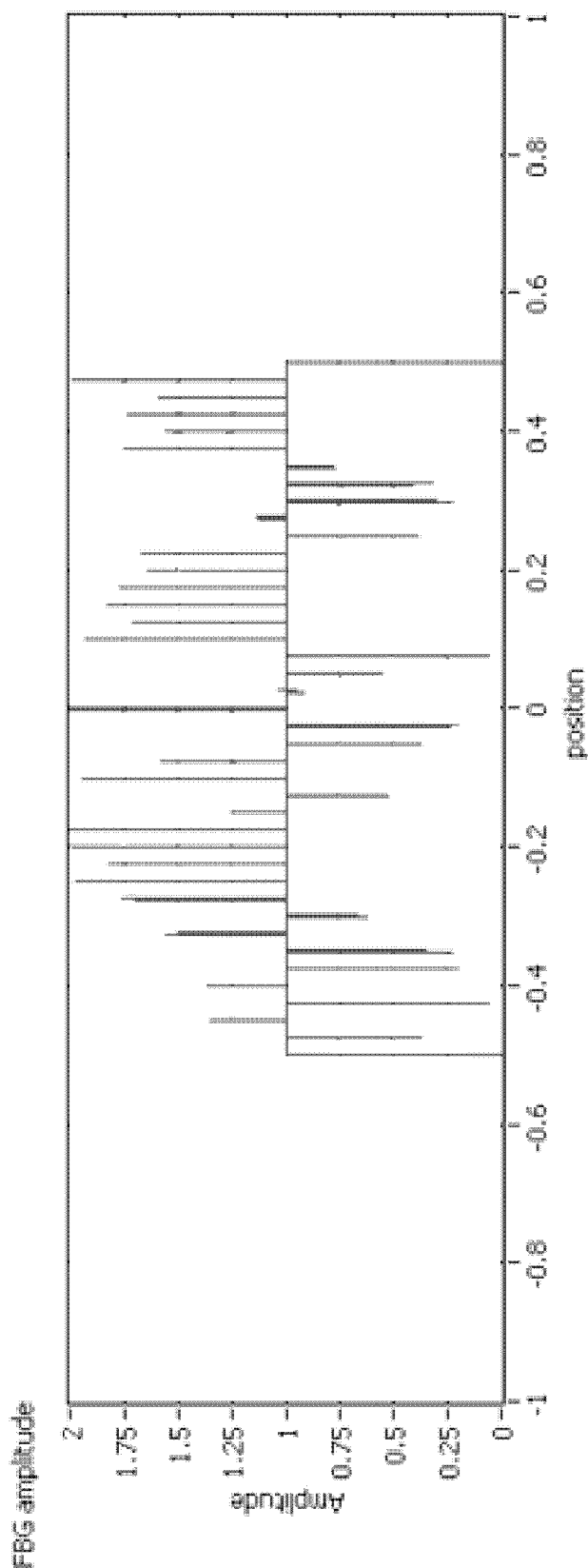
FIG. 3 shows the normalized amplitude of a taper function versus normalized position on the fiber. The taper function consists of 40 gratings with 0.001 overlap.
Figure 4:
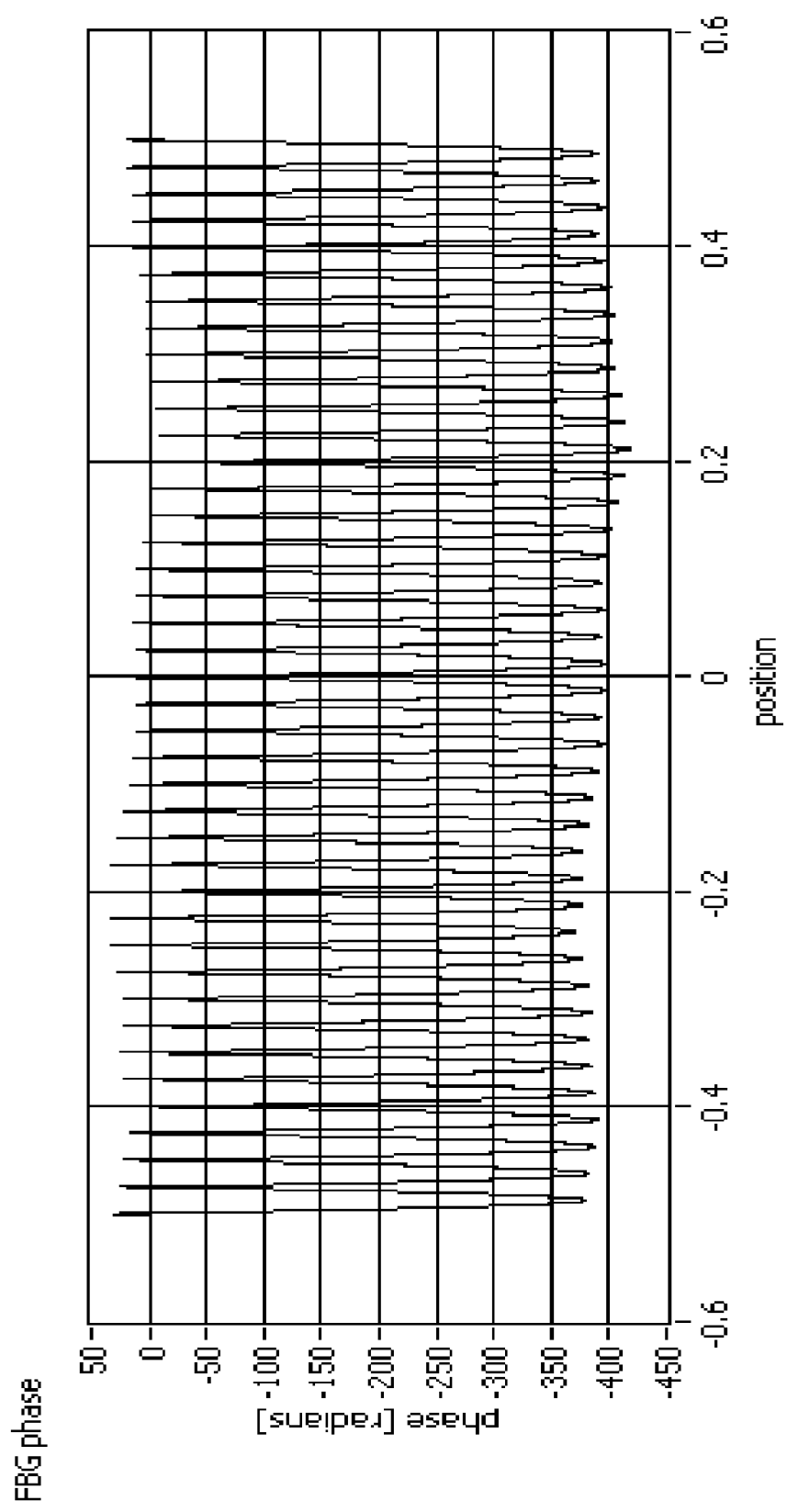
FIG. 4 shows the phase of taper function versus normalized position on the fiber. The taper consists of 40 gratings with 0.001 overlap. The normalized chirp constant equals the normalized tuning range.

After Fourier transforming the taper function with normalized amplitude as given by FIG. 3 and phase as given by FIG. 4 using the formalism of Eq. (II.1) of Annex II, one obtains a complex Fresnel reflection coefficient. The result is displayed in FIG. 5. The normalized tuning range from −32000 to +32000 corresponds to a wavelength span of a little more than 16 nm.

Figure 5:
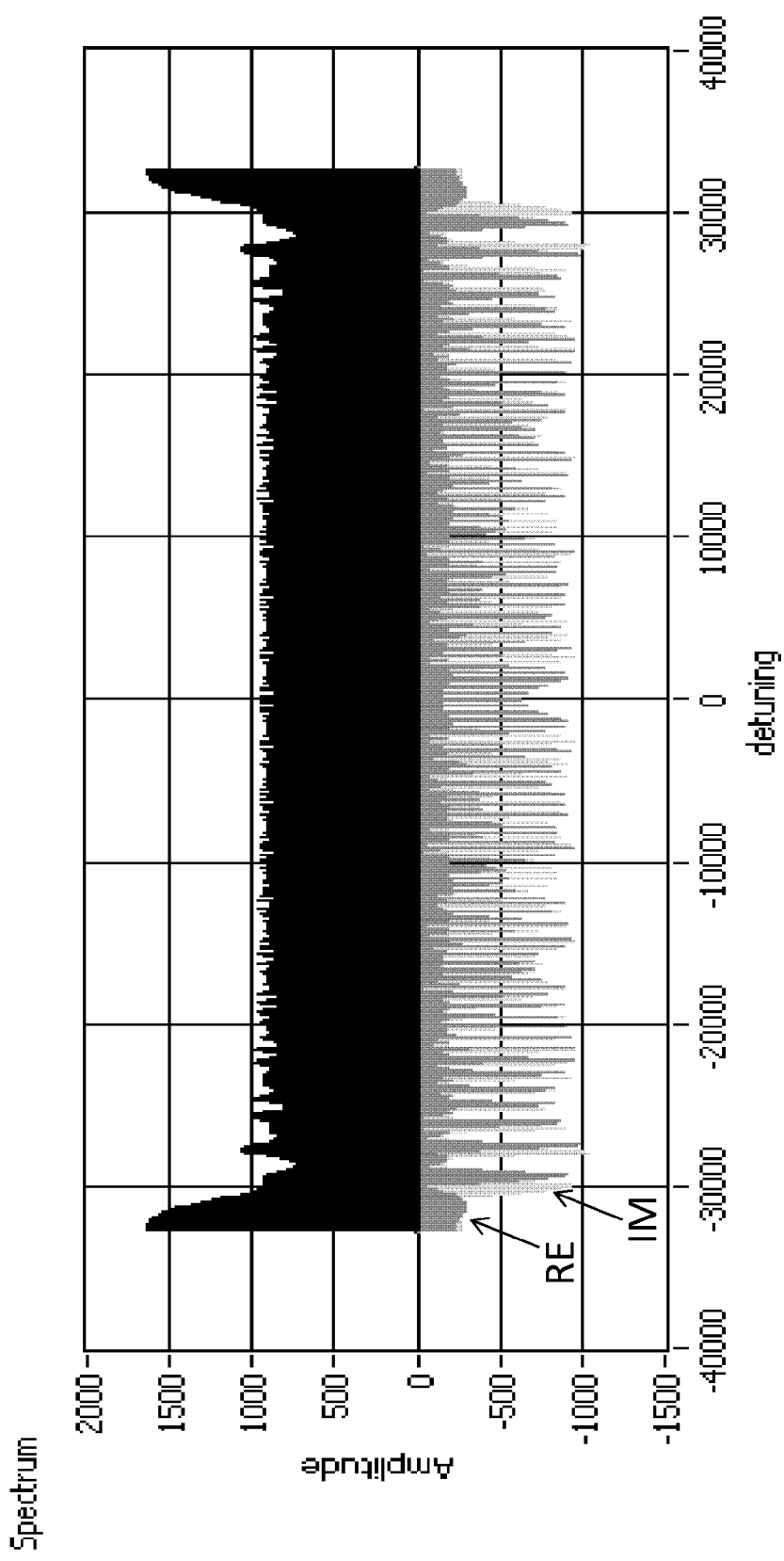
FIG. 5 shows the amplitude (in arbitrary units) of the Fresnel reflection coefficient versus detuning. In the upper part, the absolute value, in dark grey the real part (RE) and in light grey the imaginary part (IM) of the reflection coefficient as indicated with the arrows.
Figure 6:
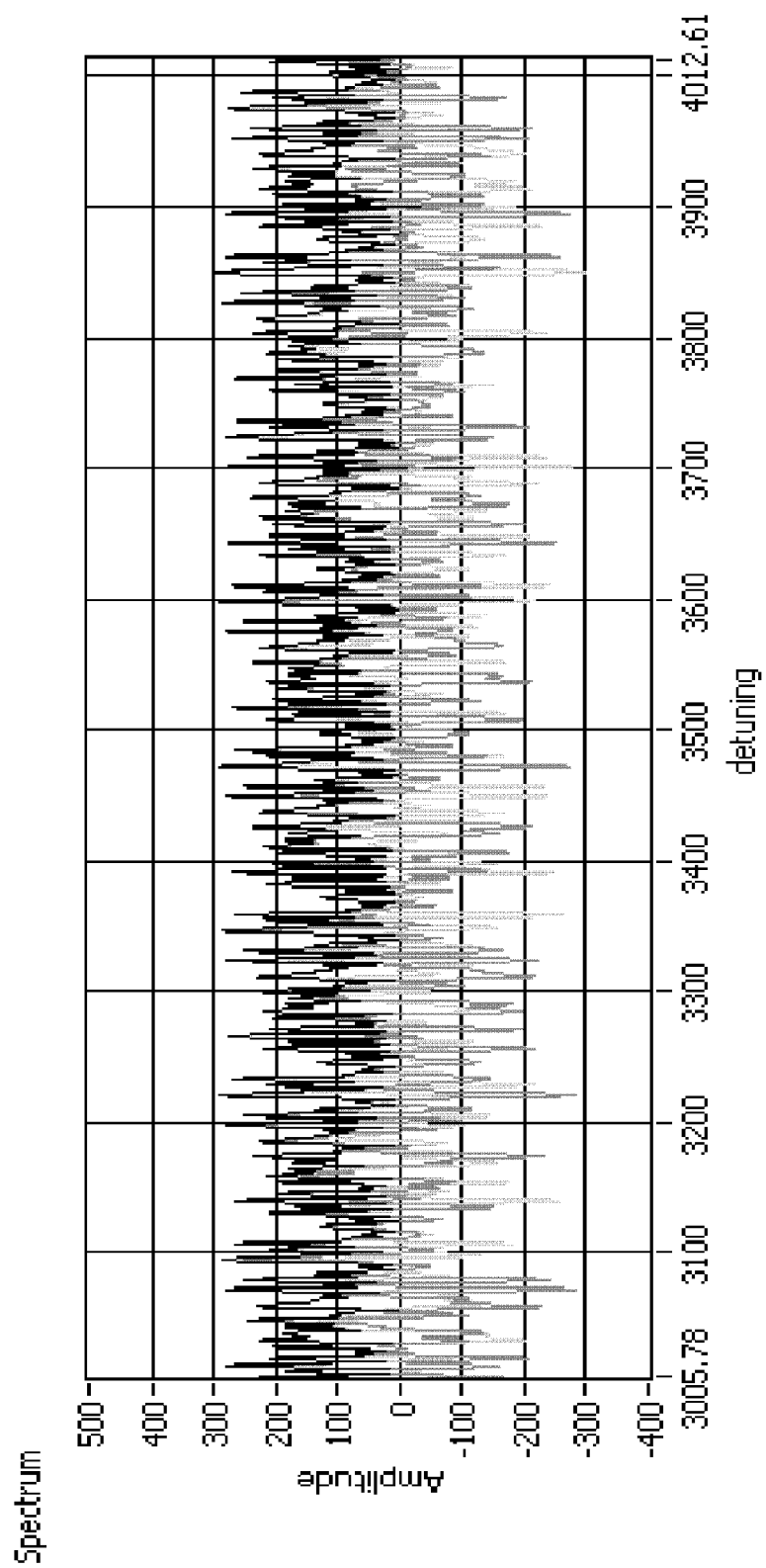
FIG. 6 shows a zoomed-in part of normalized reflection spectrum (see also FIG. 5) from 40 linearly chirped gratings.

The spectrum of FIG. 5 is rapidly varying function of closely packed peaks, completely filling the spectral band of interest. A zoomed part of the spectrum is given in FIG. 6. By choosing the absolute phase of the taper function for each of the gratings with a random offset (which will be true in practice) there is seemingly no structure in the spectrum, mimicking a Rayleigh scatter pattern.

Consider a design where the total width of the reflection spectrum corresponds with the total measurement range. Strain will shift at least a part of the spectrum with a finite probability that is shifts beyond the measurement range. In that case a part of certain gratings with strain will not be fully monitored, giving rise to gaps in the strain information along the fiber. To alleviate this problem, one could increase the overlap of consecutive linearly chirped gratings. Each position on the fiber has a corresponding resonance wavelength. The start of a grating and the end will have the most extremely separated resonance wavelengths. An overlap at the beginning of a grating with the previous one and at the end with the next one causes the overlap regions to have two different resonance wavelengths. In case one of them shifts beyond the measurement range the other will shift more towards the center of the measurement range. Overlap of the gating, therefore, ensures continuity of the strain information along the fiber.

Figure 7:
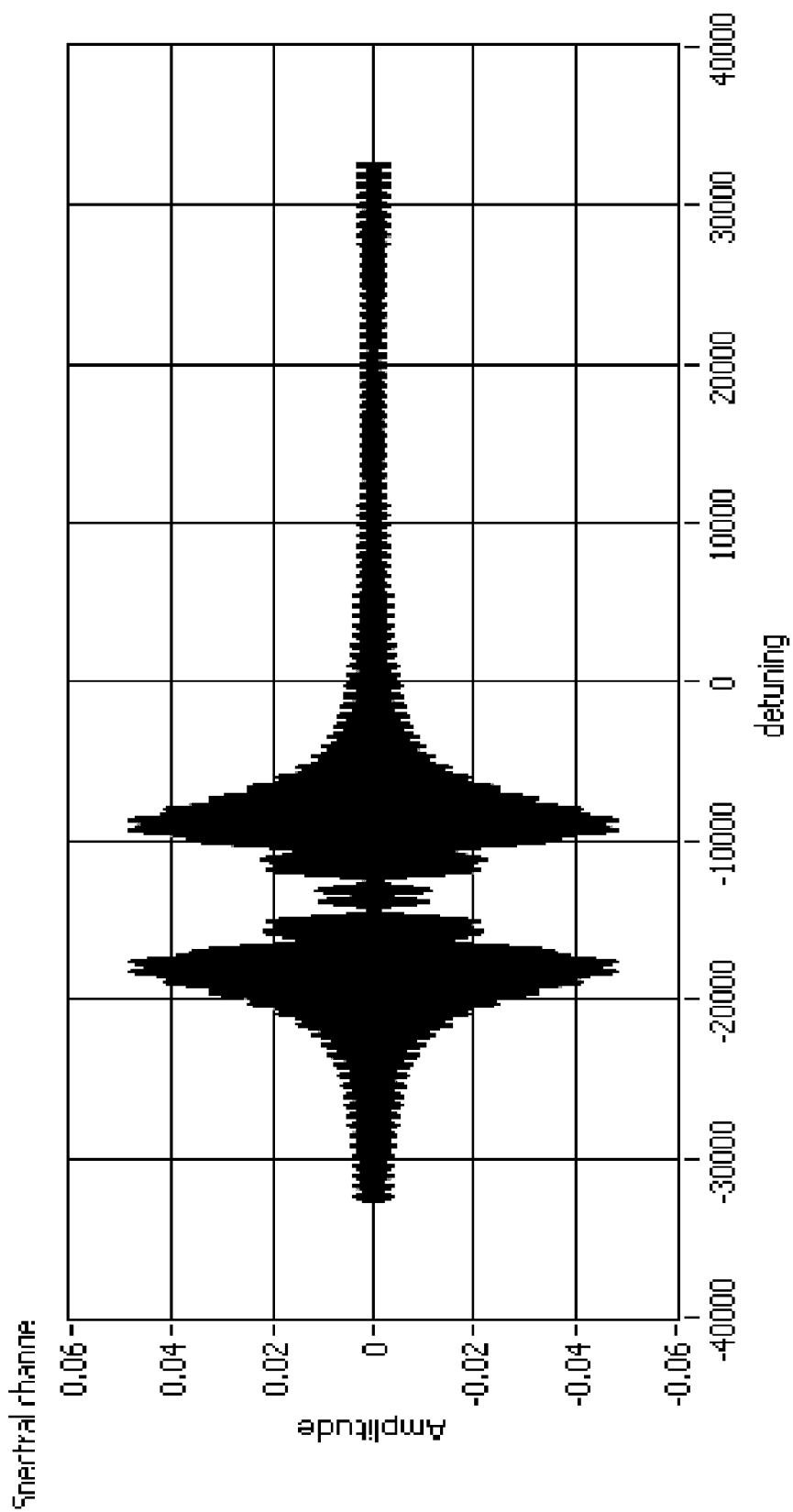
FIG. 7 shows the change of the amplitude of the reflection spectrum of FIG. 5 due to strain with a magnitude of 0.1 microstrain over 0.005 part of the fiber.

One also may calculate the sensitivity to strain. In FIG. 7 the change in amplitude of the reflection spectrum due to 0.1 micro strain (a length change of $10^{-7}$) over a length of 0.005 part of the fiber. In case of a complete homogeneous taper function (like Rayleigh scattering) the change due to a localized strain would be visible over the full spectral band. For a set of chirped gratings the taper function is less homogeneous and consequently the spectral change will only be on a part of the total detuning range. However, FIG. 7 reveals changes over at least 15% of the tuning range while only 0.5% of the fiber is strained.

The invention regarding the single core fiber can be used in applications where a distributed temperature and/or strain profile is monitored in an interferometric way.

The invention regarding the multi-core can be applied in all minimally invasive procedures where tracking and/or localization of medical devices such as guide wires, catheters and the like are important.

REFERENCES

US 2011/0109898, Mark E. Froggatt, Justin W. Klein, Dawn K. Gifford, and Stephen Tod Kreger, "Optical position and/or shape sensing".
US 2011/0310378, Mark E. Froggatt, Justin W. Klein, "Interferometric measurement with crosstalk suppression".
U.S. Pat. No. 7,781,724, Brooks A. Childers, Dawn K. Gifford, Roger G. Duncan, Matthew T. Raum, Michael E. Vercillino and Mark E. Froggatt, "Fiber optic shape sensing device and method relating thereto".
H. Kogelnik, "Filter response of non uniform almost-periodic structures", Bell System Techn. J. 55(1), 1976, 109
M. Sumetsky et al., "Holographic methods for phase mask and fiber grating fabrication and characterization" in Laser Micromachining for Optoelectronic Device Fabrication, Andreas Ostendorf, Editor, Proceedings of SPIE Vol. 4941 (2003)

All of the above references are hereby incorporated by reference in their entirety.

Annex I. Rayleigh Signal Strength and Signal to Noise Ratio

Below is an estimate of the signal of Rayleigh scattering in a single mode fiber using interferometric means. In order to check this estimate, the signal to noise is calculated and compared with the experimental values as originating from the Luna Form Acquisition system. The noise level has two contributions. One originates from the detector electronics, in particular the temperature Johnson noise of the feedback resistor in the transimpedance amplifier. The other stems from the relative intensity noise of the laser source.

Rayleigh Scattering

The loss in a telecomm fiber amounts to 0.15 dB/km and is dominated by Rayleigh scattering. This means that after about 30 km half of the light will be scattered away and a next amplifier station is incorporated. We will use a scatter parameter of:

$$\alpha_s = 0.015 \times \ln 10 \times 0.001 = 3.4 \cdot 10^{-5} \text{ m}^{-1}$$

The scattered light is distributed over the full solid angle and only a small fraction is captured in the mode of the fiber. This fraction $f_s$ is determined by the internal angle $\theta_{NA}$ corresponding to the external numerical aperture:

$$f_s = \left(\sin \frac{\theta_{NA}}{2}\right)^2 \approx \left(\frac{NA}{2n}\right)^2 = \left(\frac{0.12}{2 \cdot 1.5}\right)^2 = 1.6 \cdot 10^{-3}$$

For an input power $I_0$ in the fiber and a fiber length of L the total power of the Rayleigh scattering $I_r$ will be:

$$I_r = I_0 \alpha_s f_s L = 10^{-3} \times 3.4 \cdot 10^{-5} \times 1.6 \cdot 10^{-3} \times 1.5 = 82 \text{ pW}$$

Luckily, we are measuring in an interferometric way and the Rayleigh scattered light is mixed with a reference power similar in magnitude as the input power on the fiber, consequently the RF power on the detector is:

$$I_{RF} = \sqrt{I_0 I_r} = I_0 \sqrt{\alpha_s f_s L} = 0.3 \text{ μW}$$

A good InGaAs pin diode will have a sensitivity of about 1 A/W so that the detector current $i_{RF}$ amounts to about 0.3 μA.

Amplifier Noise

In a transimpedance amplifier the detector current will be pushed through a feedback resistor R giving rise to a signal voltage. The feedback resistor is limited in size by the frequency bandwidth $\Delta f$ that is needed in the following way: Stray capacitances C will short circuit the feedback resistor with an impedance $1/(\omega C)$, so that R cannot be larger than this value. It is difficult to reduce stray capacitances to values below 1 pF. The thermal noise of a resistor is given by:

$$\delta V = \sqrt{4kTR\Delta f} = \sqrt{\frac{4kT}{2\pi C}}$$

In the last part of the above equation we have taken the maximum value for the resistance R as given by the stray capacitance C. The noise floor of the transimpedance amplifier is independent of the bandwidth. The signal, however, is dependent on the bandwidth since the resistor R is inversely proportional to the bandwidth. Hence, the signal to noise ratio is inversely proportional to the bandwidth (and not to the square root of the bandwidth as the above formula might suggest). The signal to noise ratio is:

$$SNR = \frac{i_{RF} R}{\delta V} = \frac{i_{RF}}{\Delta f} \frac{1}{\sqrt{8\pi kTC}} \approx \frac{0.3 \cdot 10^{-6}}{30 \cdot 10^6 \sqrt{8\pi \times 1.38 \cdot 10^{-23} \times 300 \times 10^{-12}}} = 30$$

We have limited the amplifier to 30 MHz. This value is obtained by considering a swept laser source at 500 nm/s with a clock interferometer with 20 m delay giving rise to a clock frequency of about 6 MHz. In order to properly correct for variations in the clock signal the sampling rate is set 5 times higher. At 30 MHz and a stray capacitance not larger than 1 pF the feedback resistor can have a value of 5 kΩ. A signal to noise ratio in amplitude of 30 corresponds in power to a ratio of also 30 dB.

Laser RIN

In an interferometer the detector will experience apart from the RF signal also a DC signal corresponding to the power from the reference arm. This DC signal will have an amplitude noise also at the frequency of the RF signal. This contribution will give rise to a finite signal to noise ratio. A good semiconductor laser will exhibit a RIN noise level of −120 dB/Hz. Note that also here the noise is proportional to the bandwidth. This stems for the fact that laser power gives rise to a detector current, so that the electrical power is proportional to the square of the optical power. The noise has to be known at the frequency of measurement, i.e. in the MHz range. The bandwidth over which it is integrated around this frequency is the frequency difference corresponding to two adjacent points separated by the step length. This is the same as the inverse of the total scan length, viz. 1/40 ms=25 Hz. The noise level of the laser is thus −106 dB. The ratio of the RF level and the DC level equals:

$$\frac{RF}{DC} = \sqrt{\alpha_s f_s L} = 2.8 \cdot 10^{-4} \sim -71 \text{ dB}$$

The signal to noise level owing to laser noise is estimated to only 35 dB. This is rather small and we should check all our lasers (including the Luna system) what the RIN levels are. Similar to detector noise it would help tremendously to increase the signals.

Annex II. Experimental Data of Phase Signals from Fiber Bragg Gratings

Figure 8:
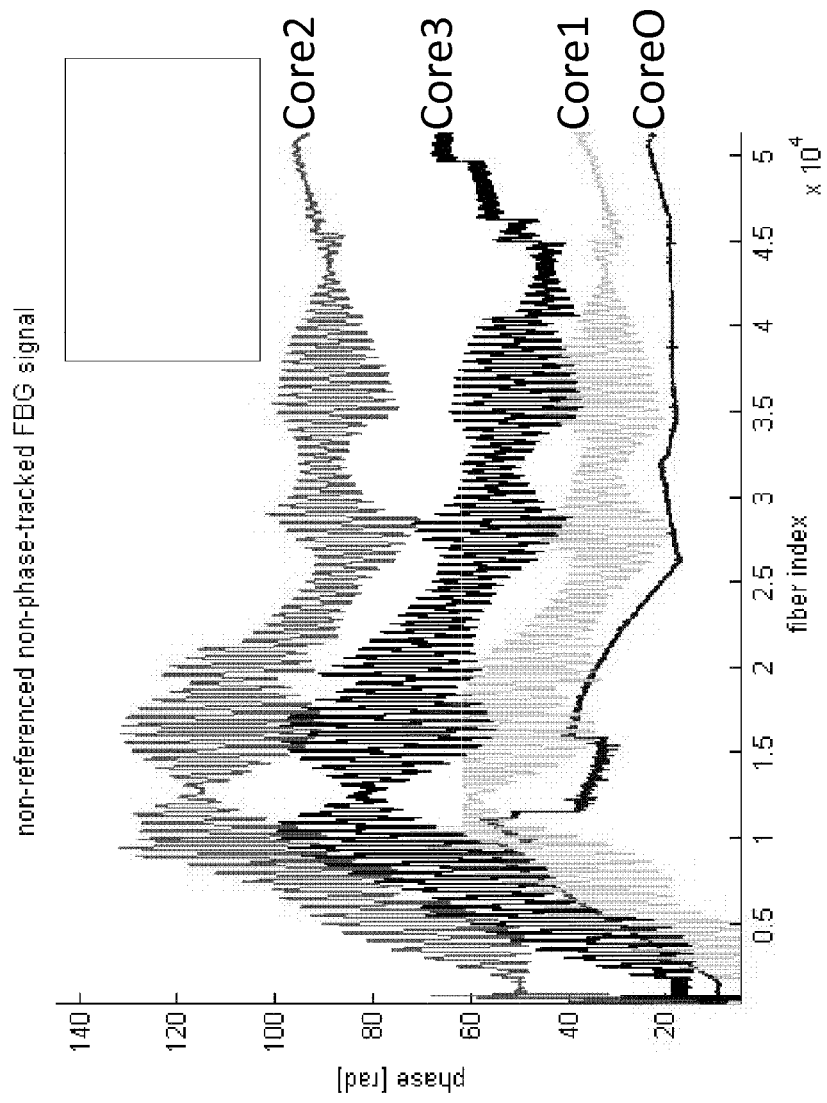
FIG. 8 shows the phase of Fourier transformed spectra of a multi core fiber with Bragg gratings.

The fiber consists of multiple cores, i.e. one central core and 3 outer cores at 50 micron distance from the central core and helically winded around the central core with a pitch of approximately 18 mm. Each core contains Bragg gratings with a length of approximately 25-30 mm and a resonance wavelength around 1543 nm. When the fiber is curved the outer cores will experience a strain. The strain will periodically change from tensile to compressive and vice versa with a periodicity of 18 mm owing to their helical winding. The reflection spectra of the four cores are measured with an interferometer over a spectral range of 20 nm around 1540 nm. Fourier transforming yields complex signals as a function of delay, i.e. position along the fiber. In FIG. 8, the phase of this complex signals is shown after subtracting a constant slope arising from the fact that the resonance is not in the center of spectral scan.

Figure 9:
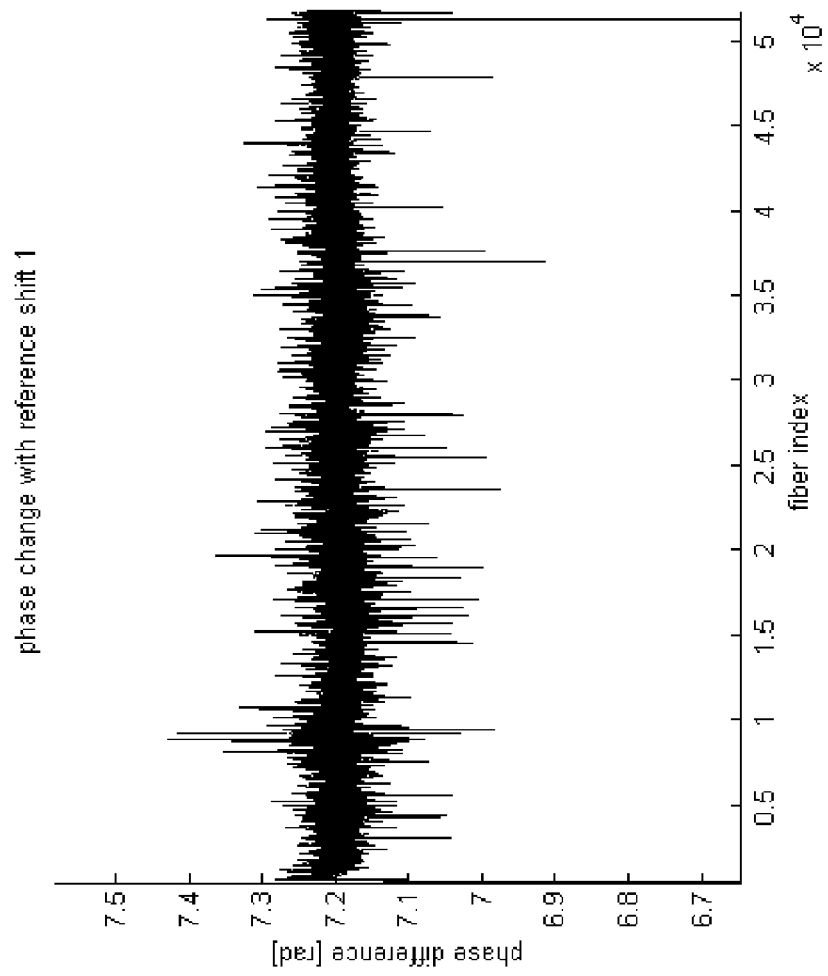
FIG. 9 shows the change of phase signal from fiber Bragg gratings when the reference is shifted by 1 index.

Clearly visible are the oscillations due to strain from bending in combination with the helical winding. This has to be compared to the phase signal of Rayleigh scattering as given in FIG. 1 Error! Reference source not found. Without subtracting the phase of a reference measurement where the fiber is in a straight line, Rayleigh signals cannot be interpreted, while Bragg gratings reveal the strain without referencing. This by itself is already a clear evidence of the robustness of the signals from Bragg grating with respect to small variations in position along the fiber, and consequently robustness against vibrations. Referencing the phase signals with a measurement of the fiber in a straight line will enhance the strain information for both fiber Bragg gratings as well as Rayleigh signals. When the reference is shifted by a small amount (a fraction of a fiber index) the phase of the Rayleigh signal will lose its coherence and no sensible strain information can be retrieved. On the other hand, the signals from fiber Bragg gratings are rather robust against shifts of the reference data. Consider the phase signal of an outer core as a function of position along the fiber as given in FIG. 8 and subtract the phase signal of the reference measurement. Repeat the same but shift the reference phase signal by one fiber index (about 40 micron). These two phase difference signals are exactly the same apart from given a constant offset. This is depicted in FIG. 9 where this change of phase difference is plotted versus position along the fiber. The referenced phase signal changes only with a constant value (not adding to strain due to bending). Furthermore, the added noise due to shifting is less than ±0.1 radian, showing the robustness of the Bragg signal.

Annex III. Theoretical Framework of Fiber Bragg Gratings

Kogelnik has shown that for Bragg gratings there is simple relationship between the reflectivity as a function of wavelength on the one hand and the taper function of the grating on the other hand.

$$r(\delta^*) = -i \int_{-0.5}^{0.5} \Omega^* e^{-2i\delta^* z^* + i\phi} dz^* \quad (\text{II}.1)$$

Here, $\Omega$ is the amplitude of the taper function, i.e. the coupling strength between the forward and backward propagating wave in the fiber and results from a periodicity in the dielectric constant of the core, $\phi$ is the phase of the taper function. When amplitude $\Omega$ and phase $\phi$ are constant, it means that the periodicity $\Lambda$ of the grating is fixed and the integral results in a sync function centered at $\delta$=0. In general both $\Omega$ and $\phi$ are a function of position z*, or in other words the grating is non-uniform. The gratings will have an almost periodic structure, i.e. the taper function exhibits only a small dependency on position, so that the wavelength dependence can be viewed as a perturbation around a central resonance:

$$\lambda_b = 2n\Lambda \quad (\text{II},2)$$

In Eq. (II.1) a detuning parameter $\delta$ is used, which describes the wavelength shift from the central resonance:

$$\delta^* = \left(\frac{2\pi n}{\lambda} - \frac{\pi}{\Lambda}\right) L \quad (\text{II}.3)$$

Furthermore in Eq. (II.1) the non dimensionless quantities have been reduced to dimensionless quantities by normalizing them with the length L of the fiber ($\delta^*=\delta \cdot L$, $\Omega^*=\Omega \cdot L$ and $z^*=z/L$). The taper function is zero outside the fiber so that the integral can be taken from −∞ to +∞. In that case Eq. (II.1) has the form of a Fourier integral, where the additional factor 2 in the exponent stems from the fact that the light propagates forth and back in a reflection experiment so that twice the distance is travelled.

The object here is to design taper functions so that the reflection spectrum fills a certain band with a detuning range $\Delta\delta^*$. The width of this band can be chosen at our convenience. In the design we have to make a principle choice between a homogeneous distribution and an inhomogeneous distribution. In the homogeneous case, we have to create many gratings each stretching over the full length of the fiber but all having a different resonance wavelength and a different, random phase. At every position of the fiber all the gratings are existing, therefore, this is a homogeneous distribution and mimics the resemblance of Rayleigh scattering. In order to have non-zero reflections over a detuning range $\Delta\delta^*$, we have to take $N=\Delta\delta^*/\pi$ gratings, where the resonance shift $\delta k^*$ of the gratings equals $2\pi j$ with $-N/2<j<N/2$. The formula for the reflection reads:

$$r(\delta) = -i\Omega^* \sum_{j=-N/2}^{N/2} \operatorname{sinc}[\delta - j\pi - \varphi_j] \quad \text{(II.4)}$$

Note, that the phase $\phi_j$ is a random number. For a real situation with a fiber length of 1 m and a wavelength band of 20 nm centered around 1540 nm, the number of gratings N that have to be written over the full length of the fiber is unpractical large and amounts to more than $10^4$. Consequently we will disregard this option.

In the inhomogeneous case we have one grating that is chirped in such a way that every position in the fiber has its own resonance wavelength covering the full span of the detuning range. In case the resonance shift is linear with position, the phase of the taper function needs to have a quadratic dependence on position:

$$\phi(z^*) = \delta k^* \cdot z^{*2} \quad \text{(II.5)}$$

The accompanying reflection as function of detuning is given by:

$$r(\delta^*) = -i\Omega^* \sqrt{\frac{\pi}{2\delta k^*}} e^{-i\delta^{*2}/\delta k^*} \left[ \begin{array}{l} C\left(\sqrt{\frac{2\delta k^*}{\pi}}\left(\frac{1}{2}+\frac{\delta^*}{\delta k^*}\right)\right) + iS\left(\sqrt{\frac{2\delta k^*}{\pi}}\left(\frac{1}{2}+\frac{\delta^*}{\delta k^*}\right)\right) + \\ C\left(\sqrt{\frac{2\delta k^*}{\pi}}\left(\frac{1}{2}-\frac{\delta^*}{\delta k^*}\right)\right) + iS\left(\sqrt{\frac{2\delta k^*}{\pi}}\left(\frac{1}{2}-\frac{\delta^*}{\delta k^*}\right)\right) \end{array} \right] \quad \text{(II.6)}$$

In Eq. (II.6) the symbols C and S stand for Fresnel integrals. In contrast to the homogeneous case the linearly chirped Bragg grating gives rise to a complex Fresnel reflection coefficient. Eq. (II.6) can also be used for the case of concatenated chirped gratings, i.e. a fiber with N equally chirped gratings but smaller length one after the other. Each of these gratings will exhibit a similar Fresnel reflection coefficient with an additional phase factor corresponding to the position on fiber.

Thus, in short the invention relates to an optical sensing system (1) for determining the position and/or shape of an associated object (O), the system comprises an optical fibers (10) having one or more optical fiber cores (9) with one or more fiber Bragg gratings (FBG, 8) extending along the full length where the position and/or shape is be to determined of said object (O). A reflectometer (REFL, 12) measures strain at a number of sampling points along the optical fiber cores, and a processor (PROC, 14) determines the position and/or shape based on said measured strains from the plurality of optical fiber cores. The fiber Bragg grating(s) (FBG, 8) extends along the full length of said optical fiber cores (9), the fiber core having a spatially modulated reflection (r) along the said full length of the optical fiber core so that the corresponding reflection spectrum is detectable in said wavelength scan. Thus, the fiber Bragg grating(s) may be effectively continuous along the optical fiber leaving no gaps so that every position gives rise to a detectable reflection, and achieving that the reflection spectrum may encompass a wavelength span equaling the wavelength scan, or 'sweep', of an optical source in the reflectometer.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An optical sensing system for determining the position and/or shape of an associated object, the system comprising:
   one or more optical fibers for spatial fixation on, in, or to said associated object, each optical fiber having one or more optical fiber cores,
   a plurality of optical fiber cores having one or more fiber Bragg gratings extending along a full length of said optical fiber cores where the position and/or shape is be to determined of said object,
   a reflectometer optically connected to said one or more optical fibers, the reflectometer being optical arranged for measuring the strain at a number of sampling points along the plurality of optical fiber cores, and
   a processor operably connected to the reflectometer for determining the position and/or shape of the object based on said measured strains from the plurality of optical fiber cores,
   wherein the reflectometer, when working in a frequency domain, is arranged for performing a wavelength scan from a first wavelength to a second wavelength around a central wavelength ($\lambda_0$) for determining said position and/or shape, the one or more fiber Bragg gratings extending along the full length of said optical fiber cores, each of the one or more optical fiber cores having a spatially modulated reflection along the full length of the optical fiber core so that the corresponding reflection spectrum is detectable in said wavelength scan,
   wherein at least one optical fiber core has a single fiber Bragg grating extending along the full length where the position and/or shape is to be determined of said object, and
   the single fiber Bragg grating is chirped in a plurality of regions along the full length so that every sampling point in the optical core has an effective, separate resonance wavelength, each sampling point being detectable in said wavelength scan.

2. The optical sensing system according to claim 1, wherein the plurality of regions are partly overlapping each other.

3. The optical sensing system according to claim 1, wherein the single fiber Bragg grating is linearly chirped in the plurality of regions along the full length.

4. The optical sensing system according to claim 1, wherein the chirping length within the regions is chosen so that the corresponding coherence length of the phase is longer than the step length ($\Delta z$) between consecutive sampling points.

5. The optical sensing system according to claim 1, wherein at least one optical core has a plurality of fiber Bragg gratings extending along the full length, each fiber Bragg grating having a resonance wavelength different from the other fiber Bragg gratings, each grating corresponding to a sampling wavelength.

6. The optical sensing system according to claim 1, wherein the system is being arranged for sensing a position and/or a shape in N dimensions, the plurality of optical fiber cores being equal to N+1 so as to allow for temperature compensation and/or elongated strain using the additional optical fiber core.

7. The optical sensing system according to claim 1, wherein the plurality of optical fiber cores are positioned within one optical fiber, the optical fiber cores being helically twisted around a central optical fiber core.

8. The optical sensing system according to claim 1, wherein the associated object is a medical catheter, a medical inspection probe, a medical sensor, a building inspection sensor, a submarine sensor, a geological sensor.

9. A method of determining the position and/or shape of an associated object, the method comprising:
providing one or more optical fibers for spatial fixation on, in, or to said associated object, each optical fiber having one or more optical fiber cores,
providing a plurality of optical fiber cores having one or more fiber Bragg gratings extending along a full length of said optical fiber cores where the position and/or shape is be to determined of said object,
providing a reflectometer optically connected to said one or more optical fibers, the reflectometer being optical arranged for measuring the strain at a number of sampling points along the plurality of optical fiber cores, and
providing a processor operably connected to the reflectometer for determining the position and/or shape of the object based on said measured strains from the plurality of optical fiber cores,
wherein the reflectometer, when working in a frequency domain, is arranged for performing a wavelength scan from a first wavelength to a second wavelength around a central wavelength ($\lambda_0$) for the determining said position and/or shape, the one or more fiber Bragg gratings extending along the full length of said optical fiber cores, each of the one or more optical fiber cores having a spatially modulated reflection along the full length of the optical fiber core so that the corresponding reflection spectrum is detectable in said wavelength scan,
wherein at least one optical fiber core has a single fiber Bragg grating extending along the full length where the position and/or shape is to be determined of said object, and
the single fiber Bragg grating is chirped in a plurality of regions along the full length so that every sampling point in the optical core has an effective, separate resonance wavelength, each sampling point being detectable in said wavelength scan.

10. An optical unit to be applied in an associated optical sensing system for determining the position and/or shape of an associated object, the optical unit comprising:
one or more optical fibers for spatial fixation on, in, or to said associated object, each optical fiber having one or more optical fiber cores, and
a plurality of optical fiber cores having one or more fiber Bragg gratings extending along the full length of said optical fiber cores where the position and/or shape is be to determined of said object,
where the optical unit is connectable to an associated reflectometer, the reflectometer being optical arranged for measuring the strain at a number of sampling points along the plurality of optical fiber cores, an associated processor further being connectable to the reflectometer for determining the position and/or shape of the object based on said measured strains from the plurality of optical fiber cores,
wherein the reflectometer, when working in a frequency domain, is arranged for performing a wavelength scan from a first wavelength to a second wavelength around a central wavelength ($\lambda_0$) for determining said position and/or shape, the one or more fiber Bragg gratings extending along the full length of said optical fiber cores, each of the one or more optical fiber core having a spatially modulated reflection along the full length of the optical fiber core so that the corresponding reflection spectrum is detectable in said wavelength scan,
wherein at least one optical fiber core has a single fiber Bragg grating extending along the full length where the position and/or shape is to be determined of said object, and
the single fiber Bragg grating is chirped in a plurality of regions along the full length so that every sampling point in the optical core has an effective, separate resonance wavelength, each sampling point being detectable in said wavelength scan.

* * * * *